United States Patent
Kazmi et al.

(10) Patent No.: US 10,321,345 B2
(45) Date of Patent: *Jun. 11, 2019

(54) MEASUREMENT PROCEDURE UNDER ADAPTIVE FREQUENCY SEPARATION

(71) Applicant: Telefonaktiebolaget LM Ericsson (publ), Stockholm (SE)

(72) Inventors: Muhammad Kazmi, Bromma (SE); Johan Bergman, Stockholm (SE); Gary Boudreau, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,286

(22) Filed: Mar. 8, 2018

(65) Prior Publication Data
US 2018/0213422 A1 Jul. 26, 2018

Related U.S. Application Data

(63) Continuation of application No. 15/015,606, filed on Feb. 4, 2016, now Pat. No. 9,918,243.
(Continued)

(51) Int. Cl.
*H04W 24/08* (2009.01)
*H04W 4/00* (2018.01)
(Continued)

(52) U.S. Cl.
CPC .............. *H04W 24/08* (2013.01); *H04W 4/70* (2018.02); *H04W 76/28* (2018.02); *H04W 24/10* (2013.01)

(58) Field of Classification Search
CPC ... H04W 24/08; H04W 76/048; H04W 4/005; H04W 24/10
See application file for complete search history.

(56) References Cited

U.S. PATENT DOCUMENTS

| 8,989,027 B2* | 3/2015 | Kim ..................... H04W 24/10 370/252 |
| 2013/0064119 A1* | 3/2013 | Montojo ........... H04W 36/0061 370/252 |

FOREIGN PATENT DOCUMENTS

| JP | 2015-501616 A | 1/2015 |
| JP | 2015-503264 A | 1/2015 |

(Continued)

OTHER PUBLICATIONS

3GPP TR 45.820 V0.3.0 (Mar. 2015), 3rd Generation Partnership Project; Technical Specification Group GSM/EDGE Radio Access Network; Cellular System Support for Ultra Low Complexity and Low Throughput Internet of Things; (Release 13), http://www.3gpp.org, (c) 2015, 54 pages.
(Continued)

Primary Examiner — Kiet Tang
(74) Attorney, Agent, or Firm — Baker Botts, LLP

(57) ABSTRACT

According to some embodiments, a method in a wireless device comprises determining the wireless device is capable of narrow bandwidth operation. The wireless device obtains a parameter associated with a measurement pattern. The measurement pattern comprises: a first time period and a second time period; a first type of radio measurements to be performed during the first time period on radio signals transmitted in a first set of physical resource channels; and a second type of radio measurements to be performed during the second time period on radio signals transmitted in a second set of physical resource channels. The wireless device determines a measurement pattern using the obtained parameter, and performs radio measurements of the first type during the first time period.

24 Claims, 8 Drawing Sheets

Related U.S. Application Data

(60) Provisional application No. 62/112,410, filed on Feb. 5, 2015.

(51) Int. Cl.
*H04W 24/10* (2009.01)
*H04W 76/28* (2018.01)
*H04W 4/70* (2018.01)

(56) References Cited

FOREIGN PATENT DOCUMENTS

| WO | 2013/067386 | A1 | 10/2013 |
|---|---|---|---|
| WO | 2014/111693 | A1 | 7/2014 |

OTHER PUBLICATIONS

Martin Beale, et al., "Support of Low Complexity LTE Terminals," 978-1-4673-0990-5/12 (c) 2012, 6 pages.

PCT, Notification of Transmittal of the International Search Report and the Written Opinion of the International Searching Authority, or the Declaration, International Application No. PCT/IB2016/050612, Filing Date, Feb. 5, 2016, dated Apr. 19, 2016, 15 pages.

Kazmi et al., Provisional Patent Application entitled "Measurements Under TX/RX Frequency Separation Field" U.S. Appl. No. 62/112,410, filed Feb. 5, 2015.

Bonade & Kobayashi IP Law, "Report Notice for Reasons of Rejection," to Ericsson; Japanese Patent Application No. 2017-541341, dated Oct. 17, 2018, 2 pages.

Japanese Patent Office, "Notice for Reasons of Rejection," Japanese Patent Application No. 2017-541341 in Japanese (English translation of this document is included); dated Oct. 2, 2018; 9 pages.

Korean Patent Office, "Summary of the Notice of Preliminary Rejection," Korean Patent Application No. 2017-7024640 in Korean (English translation of the document is included); dated Oct. 20, 2018; 9 pages.

Huawei, "Discussion on support of narrowband operation for MTC," 3GPP TSG-RAN WG4 Meeting #74, R4-160353, Athens, Greece, Feb. 9-13, 2015; 3 pages.

Sony, "MTC Operation with a Narrowband PDCCH," 3GPP TSG-RAN WG1 Meeting #79, R-145018, San Francisco, USA, Nov. 17-21, 2014; 15 pages.

Korean Patent Office, "Patent Allowance," Korean Patent Application No. 2017-7024640 in Korean (English translation of p. 1 of the Korean Patent Allowance is included); dated Mar. 16. 2019; 6 pages.

\* cited by examiner

MEASUREMENT PROCEDURE UNDER ADAPTIVE FREQUENCY SEPARATION

PRIORITY

This nonprovisional application is a continuation of U.S. application Ser. No. 15/015,606, filed Feb. 4, 2016, and entitled Measurement Procedure Under Adaptive Frequency Separation and claims priority to U.S. Provisional Application No. 62/112,410 filed Feb. 5, 2015.

RELATED APPLICATION

This application claims benefit under 35 U.S.C. § 119(c) to U.S. Provisional Application Ser. No. 62/112,410 entitled "MEASUREMENTS UNDER TX/RX FREQUENCY SEPARATION," filed Feb. 5, 2015, the entire content of which is incorporated herein by reference.

TECHNICAL FIELD

Particular embodiments relate generally to wireless communications and more particularly to measurement procedures for use with narrowband machine type communication (MTC) user equipment (UE) with adaptive transmit-receive (Tx-Rx) frequency separation.

BACKGROUND

Machine-to-machine (M2M) communication (also referred to as machine type communication (MTC)) establishes communication between machines and between machines and humans. The communication may include exchange of data such as signaling, measurement data, configuration information, etc. The device size may vary from that of a wallet to that of a base station. M2M devices are often used for applications like sensing environmental conditions (e.g., temperature reading, etc.), metering or measurement (e.g., electricity usage, etc.), fault finding or error detection, etc. In these applications the M2M devices may be inactive for relatively long periods of time. For example, depending on the type of service, the M2M device may be active for about 200 ms every 2 seconds, about 500 ms every 60 minutes, etc. The M2M device may also perform measurements on other frequencies or other radio access technologies (RATs).

A particular category of M2M devices may be referred to as low cost devices. Cost reduction may be realized by relaxing the requirements on peak rate and receiver performance. Long term evolution (LTE) Release 12 introduces a low cost user equipment (UE) category referred to as UE category 0. It specifics a relatively low peak rate of 1 Mbps and relaxed performance requirements that can be satisfied by a UE with a single antenna receiver. Cost is further reduced by supporting only half duplex (HD) capability instead of full duplex (FD) capability. Because the UE does not transmit and receive at the same time, the UE does not need a duplex filter. Additional cost reduction techniques include reducing UE bandwidth to 1.4 MHz.

Another category of M2M devices facilitate enhanced uplink (UL) and/or downlink (DL) coverage. These devices are installed at locations where path loss between the M2M device and the base station can be very large, such as a sensor or metering device located in a remote location like a building basement. In such locations, receiving a signal from a base station can be challenging. For example, the path loss can be 15-20 dB worse than what is considered normal operation. To cope with such challenges, the coverage in uplink and/or in downlink is substantially enhanced. Enhanced coverage is achieved by various techniques in the UE and/or in the network node (e.g., boosting DL transmit power, boosting UL transmit power, enhanced UE receiver, signal repetition, etc.).

MTC UEs operating with reduced bandwidth (e.g., 1.4 MHz) may be referred to as narrowband MTC operation, a narrowband MTC, or simply narrowband operation. A narrowband MTC may be scheduled with only six physical resource blocks (PRBs). An allocation of a single PRB for uplink or a single PRB for downlink is possible. Additionally, retuning the frequency of a MTC UE facilitates frequency multiplexing of users and frequency hopping.

For existing LTE UE categories, filtering requirements are defined based on the transmit-to-receive (TX-RX) frequency separation for a given frequency band as defined in TS 36.101 Table 5.7.4 as well as the defined radio frequency (RF) performance requirements of a given LTE UE category. For example, the transmit-receive carrier center frequency separation can be 190 MHz for E-UTRA band 1 (i.e., 2 GHz) and 45 MHz for band 8 (i.e., 900 MHz).

FIG. 1 illustrates an example transmit-receive frequency separation for frequency division duplex (FDD) operation. FIG. 1 illustrates an uplink band and a downlink band separated by a band gap. A subset of PRBs in the uplink band is allocated for narrowband uplink operation and a subset of PRBs in the downlink band is allocated for narrowband downlink operation. The separation between the center of the subset of PRBs in the uplink band and the center of the subset of PRBs in the downlink band is referred to as the duplex spacing.

Using a narrower transmit-receive frequency separation may result in self-interference between the MTC UE transmitter and receiver that exceeds the filtering ability of the MTC UE and prevents the MTC UE from meeting its expected performance levels. This may degrade the error rate performance of the MTC UE and/or reduce the coverage capabilities of the MTC UE. Such a situation can occur if the uplink and downlink PRB allocations for full duplex FDD transmissions are assigned independently. For example, FIG. 1 illustrates assigned uplink PRBs that are close to the upper edge of the uplink band and assigned downlink resources that are close to the lower edge of the downlink band. In this scenario, if the band gap is significantly smaller than the permitted minimum transmit-receive carrier frequency separation, the UE's duplexer filtering may not be sufficient to meet its expected performance requirements.

Resource blocks may be allocated in any part of the spectrum in the downlink or uplink parts of the hand. In other words, the narrow bandwidth operations (e.g., six RBs or less) may be supported in both RF and baseband anywhere in frequency within the cell system bandwidth, such as illustrated in FIG. 2.

FIG. 2 illustrates an example transmit-receive frequency separation for narrowband operation. FIG. 2 illustrates an uplink band and a downlink band separated by a band gap. Also identified are the UL carrier center frequency and the downlink carrier center frequency. A subset of six PRBs in the uplink band is allocated for narrowband uplink operation and a subset of six PRBs in the downlink band is allocated for narrowband downlink operation. As illustrated, the transmit-receive frequency separation of the uplink and downlink bands is larger than the transmit-receive frequency separation of the narrowband uplink and downlink allocation. The transmit-receive frequency separation of the narrowband uplink and downlink allocation is not much greater than the band gap.

Based on the requirements described above for low cost narrowband MTC UEs, the minimum transmit-receive frequency separation can be less than the specified value for each band. Furthermore, the MTC UE may transmit with full power in a narrow bandwidth close the band edge. Accordingly, ensuring that the duplexer gap is sufficient to support existing performance requirements may include defining a minimum separation between transmit and receive carriers within the frequency band for narrowband MTC operation. If the performance requirements cannot be met by the transmit-receive separation, then an alternative is to reduce transmit power to compensate accordingly.

A UE typically performs radio measurements on the serving (as well as on neighbor cells) over some known reference symbols or pilot sequences. The UE may perform measurements on an intra-frequency carrier, inter-frequency carrier(s) as well as on inter-RAT carriers(s) (depending upon the UE capabilities). To enable inter-frequency and inter-RAT measurements, the network may configure measurement gaps.

The measurements serve various purposes. Example measurement purposes include: mobility, positioning, self-organizing network (SON), minimization of drive tests (MDT), operation and maintenance (O&M), network planning and optimization, etc. Examples of UE measurements in LTE include cell identification (i.e., physical cell ID (PCI) acquisition), system information (SI) acquisition, reference symbol received power (RSRP), reference symbol received quality (RSRQ), CSI-RSRP, CSI-RSRQ, discovery signal measurements, cell global identity (CGI) acquisition using autonomous gaps, reference signal time difference (RSTD), UE Rx-Tx time difference measurement, radio link monitoring (RLM), which consists of out of synchronization (out of sync) detection and in synchronization (in-sync) detection, etc.

The UE typically obtains radio measurements by averaging more than one sample or snapshot in the time and/or frequency domain. For example, a UE may perform RSRP/RSRQ measurements over 200 ms by averaging 4 or 5 snapshots or samples taken every 40 or 50 ms where each snapshot may be 1 or 2 ms long.

A UE performs channel state information (CSI) measurements that the network uses for scheduling, link adaptation, etc. Examples of CSI measurements or CSI reports include channel quality indication (CQI), pre-coding matrix indicator (PMI), rank indicator (RI), etc. The UE may perform CSI measurements on reference signals like cell specific reference signals (CRS), CSI reference signals (CSI-RS), or demodulation reference signals (DMRS).

To support functions such as mobility (e.g., cell selection, handover, etc.), positioning, link adaption, scheduling, load balancing, admission control, interference management, interference mitigation, etc., the network node also performs radio measurements on signals transmitted and/or received by the network node. Examples of such measurements include signal-to-noise ratio (SNR), signal-to-interference-plus-noise ratio (SINR), received interference power (RIP), block error ratio (BLER), propagation delay between UE and the network node, transmit carrier power, transmit power of specific signals (e.g., Tx power of reference signals), and positioning measurements like time advance (TA), eNodeB Rx-Tx time difference, etc.

In LTE a UE performs radio measurements on radio signals (e.g., discovery signals, reference signals, etc.) that are transmitted in predefined time-frequency resources. For example, the UE performs cell identification using PSS/SSS, which are transmitted in the central six resource blocks of the downlink carrier frequency in a cell (i.e., in the six central RBs of cell transmission bandwidth). Similarly, a UE measures RSRP and RSRQ on the six central RBs of the bandwidth of an identified cell.

The MTC UE may, however, be configured to operate in a narrow bandwidth. Narrow bandwidth operation is characterized by a UE operable to use fewer resource blocks compared to a total number of RBs in system bandwidth. This is referred to as a narrower bandwidth with respect to system bandwidth. In narrow bandwidth operation, the RF filter in the UE for uplink and/or downlink operation is tuned over the narrower RF bandwidth. In traditional LTE operation, particular data or control channels may be transmitted over a subset of RBs, but the RF bandwidth is the same as that of the system bandwidth. An example of narrow bandwidth (or narrower RF bandwidth) is an RF bandwidth of 1.4 MHz containing six RBs in a system bandwidth of 10 MHz containing fifty RBs. Narrow bandwidth operation is also characterized by a narrower transmit-receive carrier center frequency separation ($\delta f$) within the system bandwidth. For example, the narrow band may comprise a transmit-receive frequency separation of 27 MHz compared to a pre-defined or default value ($\Delta F$) such as 35 MHz for the system bandwidth.

These two attributes of narrow bandwidth operation may prevent a UE from receiving the necessary radio signals required for performing one or more radio measurements. Furthermore, because of narrow transmit-receive carrier center frequency separation ($\delta f$), UE uplink transmissions may cause self-interference with the UE's own receiver. These factors may degrade mobility performance of the MTC UE and may even result in call dropping, handover failure, positioning failure, etc.

SUMMARY

According to some embodiments, a method in a wireless device comprises determining the wireless device is capable of narrow bandwidth operation. Narrow bandwidth operation comprises transmitting and receiving wireless signals using a number of physical resource channels that is less than a total number of physical resource channels supported by the wireless communication network and using a transmit-receive frequency separation that is less than a transmit-receive frequency separation of a total bandwidth of the wireless communication network. The method further comprises obtaining a parameter associated with a measurement pattern. The measurement pattern comprises: a first time period and a second time period; one or more radio measurements of a first type to be performed during the first time period on radio signals transmitted in a first set of physical resource channels; and one or more radio measurements of a second type to be performed during the second time period on radio signals transmitted in a second set of physical resource channels. The method further comprises determining a measurement pattern using the obtained first parameter, and performing radio measurements of the first type during the first time period.

In particular embodiments, the first set of physical resource channels comprises a first number of physical resource channels which is less than the total number of physical resource channels supported by the wireless communication network. The second set of physical resource channels may comprise a second number of physical resource channels which is greater than the first number of physical resource channels.

In particular embodiments, a transmit-receive center frequency separation of the first set of physical resource channels is less than a transmit-receive center frequency separation of the total bandwidth of the wireless communication network. The first set of physical resource channels may be located at a specific frequency location within the bandwidth of the wireless communication system and the second set of physical resource channels may be located at any frequency location within the bandwidth of the wireless communication system. The first set of physical resource channels may be located at the center of the bandwidth of the wireless communication system and may comprise six physical resource blocks.

In particular embodiments, the first set of physical resource channels comprises uplink physical resource channels and downlink physical resource channels. The uplink physical resource channels are located at a first location within the bandwidth of the wireless communication system and the downlink physical resource channels are located at a second location within the bandwidth of the wireless communication system, different from the first location.

In particular embodiments, the first time period overlaps with an ON duration of a discontinuous receive cycle of the wireless device.

According to some embodiments, a method in a network node of a wireless communication network comprises determining a wireless device is capable of narrow bandwidth operation. The method further comprises determining a parameter associated with a measurement pattern. The measurement pattern comprises: a first time period and a second time period; one or more radio measurements of a first type to be performed during the first time period one or more radio signals transmitted in a first set of physical resource channels; and one or more radio measurements of a second type to be performed during the second time period on one or more radio signals transmitted in a second set of physical resource channels. At least one physical resource channel of the second set of physical resource channels is different than the physical resource channels of the first set of physical resource channels. The method further comprises communicating the parameter to the wireless device.

In particular embodiments, the first set of physical resource channels comprises a first number of physical resource channels, the first number of physical resource channels less than the total number of physical resource channels supported by the wireless communication network. The second set of physical resource channels may comprise a second number of physical resource channels which is greater than the first number of physical resource channels.

In particular embodiments, a transmit-receive center frequency separation of the first set of physical resource channels is less than a transmit-receive center frequency separation of the total bandwidth of the wireless communication network. The first set of physical resource channels may be located at a specific frequency location within the bandwidth of the wireless communication system and the second set of physical resource channels may be located at any frequency location within the bandwidth of the wireless communication system. The first set of physical resource channels may be located at the center of the bandwidth of the wireless communication system and may comprise six physical resource blocks.

In particular embodiments, the first set of physical resource channels comprises uplink physical resource channels and downlink physical resource channels. The uplink physical resource channels are located at a first location within the bandwidth of the wireless communication system, and the downlink physical resource channels are located at a second location within the bandwidth of the wireless communication system, different than the first location.

In particular embodiments, the first time period overlaps with an ON duration of a discontinuous receive cycle of the wireless device.

In particular embodiments, the network node performs one or more radio measurements of the first type during the first time period.

According to some embodiments, a wireless device comprises a processor operable to determine the wireless device is capable of narrow bandwidth operation. The processor is also operable to obtain a parameter associated with a measurement pattern. The measurement pattern comprises: a first time period and a second time period; one or more radio measurements of a first type to be performed during the first time period on one or more radio signals transmitted in a first set of physical resource channels; and one or more radio measurements of a second type to be performed during the second time period on one or more radio signals transmitted in a second set of physical resource channels. At least one physical resource channel of the second set of physical resource channels is different than the physical resource channels of the first set of physical resource channels. The processor is further operable to determine a measurement pattern using the obtained parameter, and perform one or more radio measurements of the first type during the first time period.

According to some embodiments, a wireless device comprises a narrow band determining module, an obtaining module, a pattern determining module, and a measuring module. The narrowband determining module is operable to determine the wireless device is capable of narrow bandwidth operation. The obtaining module is operable to obtain a parameter associated with a measurement pattern. The measurement pattern comprises: a first time period and a second time period; one or more radio measurements of a first type to be performed during the first time period on one or more radio signals transmitted in a first set of physical resource channels (510); and one or more radio measurements of a second type to be performed during the second time period on one or more radio signals transmitted in a second set of physical resource channels. At least one physical resource channel of the second set of physical resource channels is different than the physical resource channels of the first set of physical resource channels. The pattern determining module is operable to determine a measurement pattern using the obtained parameter. The measuring module is operable to perform one or more radio measurements of the first type during the first time period.

According to some embodiments, a network node comprises a narrowband determining module, a pattern determining module, and a communication module. The narrowband determining module is operable to determine a wireless device is capable of narrow bandwidth operation. The pattern determining module is operable to determine a parameter associated with a measurement pattern. The measurement pattern comprises: a first time period and a second time period; one or more radio measurements of a first type to be performed during the first time period on one or more radio signals transmitted in a first set of physical resource channels; and one or more radio measurements of a second type to be performed during the second time period on one or more radio signals transmitted in a second set of physical resource channels. At least one physical resource channel of the second set of physical resource channels is different than the physical resource channels of the first set of physical resource channels. The communication module is operable to communicate the parameter to the wireless device.

Also disclosed is a computer program product. The computer program product comprises instructions stored on non-transient computer-readable media which, when executed by a processor, perform the acts of determining the wireless device is capable of narrow bandwidth operation and obtaining a parameter associated with a measurement pattern. The measurement pattern comprises: a first time period and a second time period; one or more radio measurements of a first type to be performed during the first time period on radio signals transmitted in a first set of physical resource channels; and one or more radio measurements of a second type to be performed during the second time period on radio signals transmitted in a second set of physical resource channels. The instructions also perform the acts of determining a measurement pattern using the obtained parameter, and performing radio measurements of the first type during the first time period.

Another computer program product comprises instructions stored on non-transient computer-readable media which, when executed by a processor, perform the acts of determining a wireless device is capable of narrow bandwidth operation, and determining a parameter associated with a measurement pattern. The measurement pattern comprising: a first time period and a second time period; one or more radio measurements of a first type to be performed during the first time period on one or more radio signals transmitted in a first set of physical resource channels; and one or more radio measurements of a second type to be performed during the second time period on one or more radio signals transmitted in a second set of physical resource channels. At least one physical resource channel of the second set of physical resource channels is different than the physical resource channels of the first set of physical resource channels. The instructions also perform the act of communicating the parameter to the wireless device.

Particular embodiments may exhibit some of the following technical advantages. In particular embodiments, a network node is able to assign sufficient radio resources for performing both uplink and downlink radio measurements and for scheduling data transmission to the wireless device. A wireless device receives sufficient measurement opportunities based on guaranteed resources for measurement during a particular time period of each measurement pattern period. In this way mobility and positioning performance are not degraded when the wireless device operates using a narrower bandwidth than the system bandwidth and where the narrower bandwidth is not necessarily in the center of the cell bandwidth.

These advantages are achieved through a particular measurement pattern for use with a narrow bandwidth MTC wireless device. In particular embodiments, the measurement pattern comprises at least two time periods.

The pattern for the first time period comprises a first set of physical channels located at a specific location within the system bandwidth (e.g., six resource blocks centered in the system bandwidth). Thus, even if an MTC wireless device is typically operating at narrow bandwidths near the edge of the system bandwidth with a small transmit-receive frequency separation, the narrow bandwidth MTC wireless device will have at least one measurement period (i.e., the first measurement period) where it can perform measurements in narrow bandwidths located at a fixed location with improved performance characteristics (e.g., when the narrow bandwidth is centered in the system bandwidth then the transmit-receive frequency separation is equal to the system transmit-receive frequency separation). RSRP, RSRQ and cell identification are examples of radio measurements that can be performed in the six central resource blocks within the system bandwidth.

The pattern for the second time period may comprise a second set of physical channels located at any location within the system bandwidth. The MTC wireless device may use the second time period to measure other reference signals or to transmit and receive data. Observed time difference of arrival (OTDOA) reference signal time difference measurement (RSTD) is an example of a radio measurement that can be performed in the six or more resource blocks containing positioning reference signals (PRS) in the lower or upper part of the system bandwidth. The MTC wireless device may measure OTDOA RSTD during the second time period.

Accordingly, a MTC wireless device configured for narrow bandwidth operation anywhere in the system bandwidth may also be configured with a measurement pattern where at least certain resources are periodically tuned at a specific location (e.g., the six resource blocks at the center of the system bandwidth) within the system bandwidth in the frequency domain. This enables the MTC wireless device to perform radio measurements (e.g., RSRP/RSRQ, etc.) at regular intervals (e.g., every 40 ms) which in turn enables robust mobility performance even under narrow bandwidth operation.

Some embodiments may benefit from some, none, or all of these advantages. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
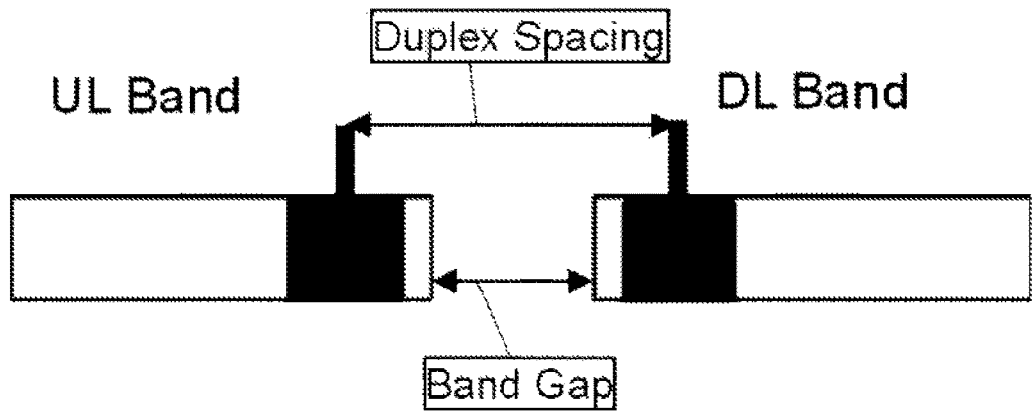
FIG. 1 illustrates an example transmit-receive frequency separation for frequency division duplex operation.
Figure 2:
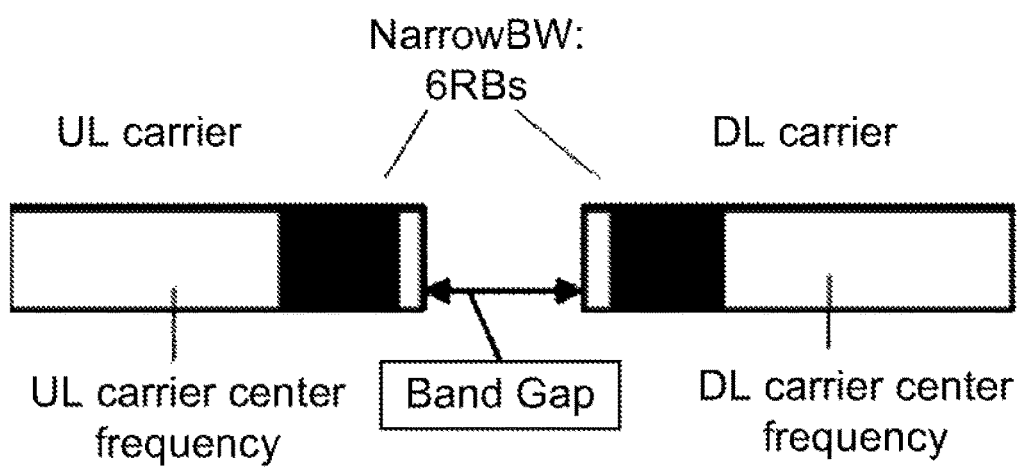
FIG. 2 illustrates an example transmit-receive frequency separation for narrowband operation.

An MTC UE configured to operate in a narrow bandwidth uses fewer resource blocks compared to a total number of resource blocks in the system bandwidth (e.g., 1.4 MHz out of 10 MHz, or six resource blocks out of fifty). The narrow bandwidth resource blocks may be characterized by a narrower transmit-receive carrier center frequency separation (δf) within the system bandwidth (e.g., 27 MHz instead of 35 MHz). These limitations may hinder the MTC UE attempting to measure discovery or reference signals.

For example, an LTE network may transmit particular discovery and reference signals in predefined time-frequency resources (e.g., PSS/SSS, RSRP, and RSRQ are transmitted in the central six resource blocks of the downlink carrier frequency). If the narrow band resources assigned to an MTC UE do not include the resource blocks in which the network transmits a particular signal, the MTC UE cannot receive and measure the signal.

Another problem is that if the transmit-receive carrier center frequency separation (δf) of the narrowbands assigned to the MTC UE is too small, the MTC UE may experience interference between its own uplink and downlink. These factors may degrade mobility performance of the MTC UE and may even result in call dropping, handover failure, positioning failure, etc.

An object of the present disclosure is to obviate at least these disadvantages and provide a measurement pattern that facilitates a narrowband MTC UE measuring discovery and reference signals located anywhere in the system bandwidth. In particular embodiments, the measurement pattern comprises at least two time periods.

The pattern for the first time period comprises a first set of physical channels located at a specific location within the system bandwidth (e.g., six resource blocks centered in the system bandwidth). Thus, even if an MTC wireless device is typically operating at narrow bandwidths near the edge of the system bandwidth with a small transmit-receive frequency separation, the narrow bandwidth MTC wireless device will have at least one measurement period (i.e., the first measurement period) where it can perform measurements in narrow bandwidths located at a fixed location with improved performance characteristics (e.g., when the narrow bandwidth is centered in the system bandwidth then the transmit-receive frequency separation is equal to the system transmit-receive frequency separation). RSRP, RSRQ and cell identification are examples of radio measurements that can be performed in the six central resource blocks within the system bandwidth.

The pattern for the second time period may comprise a second set of physical channels located at any location within the system bandwidth. The MTC wireless device may use the second time period to measure other reference signals or to transmit and receive data. Observed time difference of arrival (OTDOA) reference signal time difference measurement (RSTD) is an example of a radio measurement that can be performed in the six or more resource blocks containing positioning reference signals (PRS) in the lower or upper part of the system bandwidth. The MTC wireless device may measure OTDOA RSTD during the second time period.

By determining and communicating such a measurement pattern to an MTC UE, a network node is able to assign sufficient radio resources for performing both uplink and downlink radio measurements and for scheduling data transmission to the wireless device. A wireless device receives sufficient measurement opportunities based on guaranteed resources for measurement during the first time period of each measurement pattern period. In this way mobility and positioning performance are not degraded when the wireless device operates using a narrower bandwidth than the system bandwidth and where the narrower bandwidth is not necessarily in the center of the cell bandwidth.

The embodiments below describe methods to configure one or more measurement patterns in a MTC UE when the MTC UE operates with narrow bandwidth. The narrow bandwidth can be narrower than the cell bandwidth and the physical channels in the narrow bandwidth may be allocated anywhere within the frequency domain of the cell bandwidth. The measurement pattern(s) or associated parameters defining the pattern(s) may be configured by a network node or may be specified or pre-defined by a standard specification. A minimum transmit-receive frequency separation may be determined by the number of physical channels (e.g., PRBs) scheduled to be transmitted in the uplink by the MTC UE.

The steps performed by a MTC UE served by a network node generally include obtaining at least one parameter related to at least one measurement pattern including at least a first time period (T1) and a second time period (T2) within one period or sequence of the pattern. The pattern for the first time period contains a first set of physical channels (Cnarrow1) for enabling a first type of operation located at a specific location in frequency within the system bandwidth of the cell. The pattern for the second time period contains a second set of physical channels (Cnarrow2) for enabling a second type of operation located at any location in frequency within the system bandwidth of the cell. The first and second set of channels in each time period may be less than a set of physical channels corresponding to the total cell bandwidth. A first transmit-receive carrier center frequency separation (δf) associated with the first set of physical channels may be narrower than the transmit-receive carrier center frequency separation (ΔF) associated with the full cell bandwidth. The MTC UE determines at least one measurement pattern based on the determined at least one parameter and uses the determined at least one measurement pattern for performing one or more radio measurements during at least the first time period.

The steps performed by a network node serving a MTC UE generally include determining at least one parameter related to at least one measurement pattern including at least a first time period (T1) and a second time period (T2) within one period or sequence of the pattern. The pattern for the first time period contains a first set of physical channels (Cnarrow1) for enabling a first type of operation located at a specific location in frequency within the system bandwidth of the cell. The pattern for the second time period contains a second set of physical channels (Cnarrow2) for enabling a second type of operation located at any location in frequency within the system bandwidth of the cell. The first and second set of channels in each time period may be less than a set of physical channels corresponding to the total cell bandwidth. A first transmit-receive carrier center frequency separation (δf) associated with the first set of physical channels may be narrower than the transmit-receive carrier center frequency separation (ΔF) associated with the fill cell bandwidth. The network node determines at least one measurement pattern based on the determined at least one parameter and uses the determined at least one parameter and/or measurement pattern for performing one or more radio procedures (e.g., signaling the determined pattern and/or at least one parameter to the MTC UE for enabling it to perform one or more measurements, signaling the determined pattern to another network node, tune transceiver parameters based on the pattern, etc.).

The embodiments described herein generally include (1) methods in a MTC UE of obtaining and applying or using measurement pattern(s) associated with narrow bandwidth operation within a larger system bandwidth; (2) methods in a network node of determining and transmitting or using measurement pattern(s) associated with narrow bandwidth operation within a larger system bandwidth; and (3) methods in a MTC UE of signaling capability related to obtaining and applying measurement pattern(s) associated with narrow bandwidth operation within a larger system bandwidth.

Particular embodiments are described with reference to FIGS. 3-9B of the drawings, like numerals being used for like and corresponding parts of the various drawings. LTE (including an evolved packet core (EPC)) is used throughout this disclosure as an example cellular system, but the ideas presented herein apply to other wireless communication systems (e.g., WCDMA/UMTS, etc.) as well.

Figure 3:
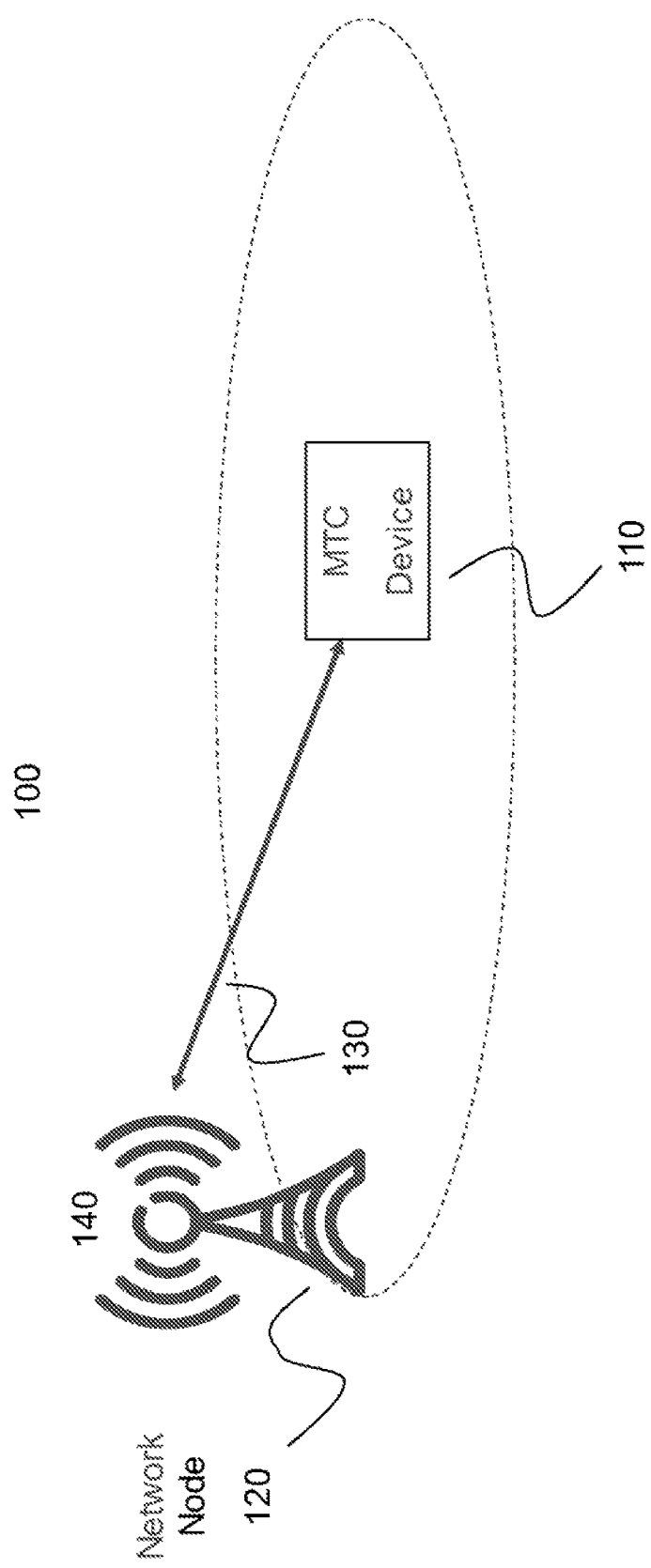
FIG. 3 is a block diagram illustrating an example of a wireless radio network, according to a particular embodiment.

FIG. 3 is a block diagram illustrating an example of a wireless radio network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes. The network nodes include network nodes 120, such as base stations or eNodeBs. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110.

Wireless signals 130 may include both downlink transmissions (from network node 120 to wireless devices 110) and uplink transmissions (from wireless devices 110 to network node 120). Wireless signals 130 may include discovery signals. Discovery signals may include, for example, reference signals used for performing Radio Resource Management (RRM) measurements. Discovery signals may also include, for example, synchronization signals such Primary Synchronization Signals (PSS) and Secondary Synchronization Signals (SSS). Wireless device 110 may detect the synchronization signals to determine system information for wireless network 100. Any of these signals or any group of these signals may be referred to as discovery reference signals (DRS).

Wireless device 110 may attempt to acquire or measure particular wireless signals 130 based on a measurement pattern. The measurement pattern may specify parameters in the time and frequency domains for measuring wireless signals 130. Network node 120 may determine a measurement pattern for wireless device 110 and may communicate the measurement pattern to wireless device 110.

Network node 120 transmits and receives wireless signals 130 using antenna 140. In particular embodiments, network node 120 may comprise multiple antennas 140. For example, network node 120 may comprise a multi-input multi-output (MIMO) system with two, four, eight, or more antennas 140.

At least one wireless device 110 is served by a cell 115 (also referred to as a serving cell or primary cell (PCell) of the wireless device). Cell 115 is managed, controlled, or served by network node 120. The serving cell operates on a carrier frequency (f1). Wireless device 110 capable of multi-carrier operation (i.e., carrier aggregation) may be served by a plurality of serving cells (e.g., PCell and one or more secondary cells (SCells). In some embodiments, dual connectivity capable wireless device 110 may be configured with PCell, and at least PSCell and potentially one or more SCells. The PCell, PSCell and SCell(s) may be managed, controlled or served by the same network node 120 or by different network nodes 120. Although embodiments herein are described for one serving cell, they are applicable to a wireless device served by any number serving cells. For multiple serving cells, the wireless device and/or network node serving the wireless device may apply the procedures described herein independently for each cell.

Particular embodiments apply to any wireless device 110 capable of full duplex FDD (FD-FDD) operation or half duplex FDD (HD-FDD) operation. Wireless device 110 may operate in FD-FDD where uplink and downlink transmission occur simultaneously in time but uplink and downlink time resources operate on different carrier frequencies. Wireless device 110 may operate in HD-FDD where uplink and downlink transmissions do not occur simultaneously in time, but the uplink and downlink time resources operate on different carrier frequencies.

The terms transmit-receive frequency separation, TX-RX or RX-TX carrier center frequency separation, TX-RX or RX-TX frequency separation, UL-DL or DL-UL frequency separation, duplexer gap, duplex gap, band separation, duplex spacing, band gap, etc. may interchangeably refer to the same concept and meaning (i.e., the separation in frequency between the simultaneous transmission and reception of physical channels). Non-limiting examples of physical channels include time-frequency resource, radio channels, resource elements (REs), physical resource blocks (PRBs), resource blocks (RBs), virtual resource blocks (VRBs), etc.

The terms cell bandwidth (BW), system bandwidth, channel bandwidth, RF system bandwidth, cell transmission bandwidth, cell reception bandwidth, cell operational bandwidth, full bandwidth, full cell or system bandwidth interchangeably refer to the same concept and meaning. The terms refer to the bandwidth of cell when operating over full bandwidth (e.g., maximum number of physical channels such as RBs). For example, an RF bandwidth of 50 MHz contains 50 RBs. The narrow bandwidth, in comparison, may have fewer channels (e.g., ten RBs) than the full bandwidth of fifty RBs.

Wireless device 110 is configurable to transmit and/or receive signals in a cell with a narrow bandwidth. Wireless device 110 may be configured with parameters that specify a particular narrow bandwidth within the system bandwidth.

Narrow bandwidth operation is characterized by a wireless device operable to use a number of assigned physical channels (Cnarrow) that is less than a total number of physical channels (Ctotal) supported by the system bandwidth of the cell (e.g., Cnarrow=6 RBs in a system bandwidth of Ctotal=50 RBs, or in terms of RF bandwidth Cnarrow 1.4 MHz within a system bandwidth of Ctotal=10 MHz). A transmit-receive carrier center frequency separation (δf) within the system bandwidth of the cell is narrower than a transmit-receive carrier center frequency separation (Δf) if full system bandwidth is used (e.g., narrower such as 27 MHz instead of a pre-defined or default value (ΔF) such as 35 MHz for the system bandwidth).

Particular embodiments may apply to particular frequency bands supported by the FD-FDD and/or HD-FDD capable wireless device, or for all bands supported by the FD-FDD and/or HD-FDD capable wireless device. Examples of particular frequency FD-FDD bands for which embodiments may apply (e.g. by means of pre-defined rule) are bands with specific frequency and/or radio characteristics. Examples of such bands are: bands whose frequencies are above a threshold (e.g., above 2 GHz), bands whose duplex gap is below a threshold (e.g., below 60 MHz), bands whose passband is larger than a threshold (e.g., 50 MHz or above), etc.

In network 100, each network node 120 may use any suitable radio access technology, such as LTE, LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 8A below. Similarly, a network node may include any suitable combination of hardware and/or software. For example, in particular embodiments, a network node, such as network node 120, may include the components described with respect to FIG. 9A below.

Particular embodiments in a wireless device of obtaining and applying measurement pattern(s) associated with narrow bandwidth operation generally include obtaining information related to one or more measurement patterns, and using the obtained measurement pattern(s) for one or more operations (e.g., performing radio measurement, etc.). A measurement pattern associated with narrow bandwidth operation may include the following characteristics.

The measurement pattern may include two time periods within a single period of the pattern: a first time period (T1) and a second time period (T2). The pattern for T1 includes a first set of physical channels (Cnarrow1) for enabling a first type of operation located at a specific location in frequency within the system bandwidth of the cell. The specific location may be pre-defined or configured by a network node. The pattern for T1 includes one or more time resources (e.g., one or more symbols, time slots, subframes, TTIs, etc.). An example of the first type of operation is a UE performing radio measurements on the first set of physical channels. The UE may also use the first set of physical channels assigned for the first type of operation, for performing other operations (e.g., a second operation such as for scheduling data). An example of a specific location is the six RBs in the center of the system bandwidth of the cell. Another example of specific location is ten RBs in the lower edge of the system bandwidth of the cell.

The pattern for T2 includes a second set of physical channels (Cnarrow2) for enabling a second type of operation located at any location in frequency within the system bandwidth of the cell. The pattern for T2 includes one or more time resources (e.g., one or more symbols, time slots, subframes, TTIs, etc.). An example of the second type of operation is scheduling the UE in uplink and/or downlink resources (e.g., UL/DL subframes) using the second set of physical channels. The UE may also use the second set of physical channels assigned for the second type of operation for performing other operations (e.g., such as for measurements).

In particular embodiments, the first and second set of physical channels (Cnarrow1 and Cnarrow2) may be less than the total set of physical channels (Ctotal) supported by the system bandwidth of the cell. The first transmit-receive carrier center frequency separation (δf) associated with the first set of physical channels can be narrower than the system transmit-receive carrier center frequency separation (ΔF). Narrower refers to smaller in magnitude, for example $\delta f| < |\Delta F|$. The pattern may include a repetition periodicity in time (i.e., pattern sequence). The pattern includes at least T1 and T2.

Figure 4:
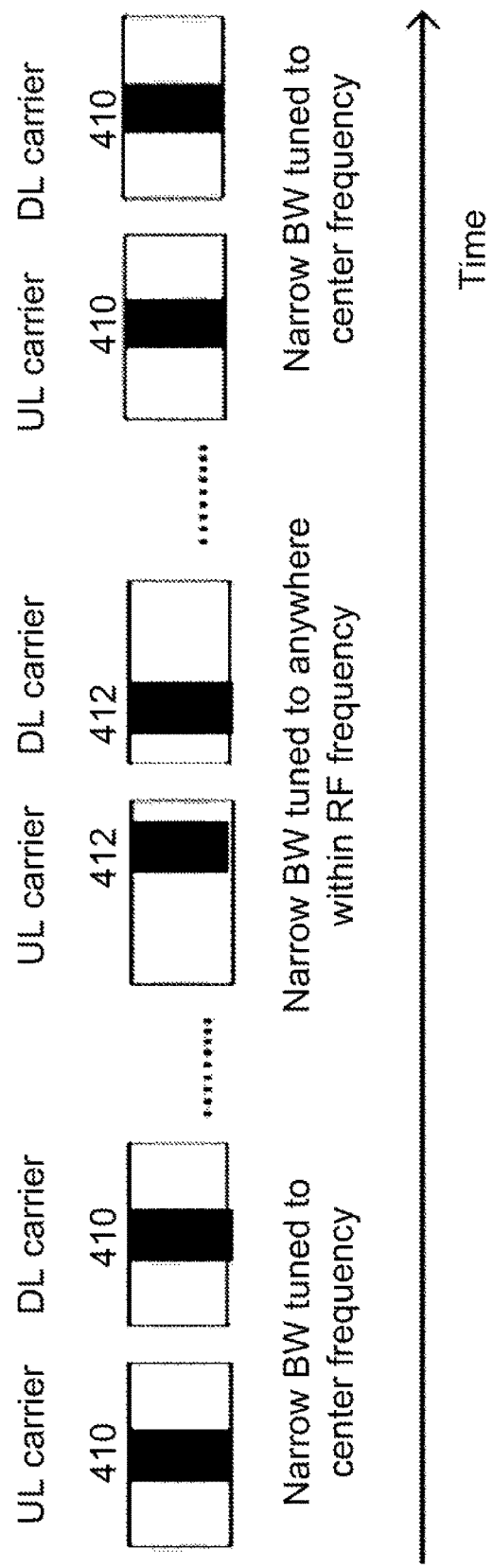
FIG. 4 is a block diagram illustrating an example measurement pattern, according to a particular embodiment.

FIG. 4 is a block diagram illustrating an example measurement pattern, according to a particular embodiment. The horizontal axis represents time. At a first time period, the uplink and downlink carriers include a first set of physical resource channels 410 comprising a narrowband within the total uplink and downlink system bandwidths. At a second time period, the uplink and downlink carriers include a second set of physical resource channels 412 comprising a narrowband within the total uplink and downlink system bandwidths. The pattern repeats over time. The pattern may be referred to a measurement pattern.

First set of physical resource channels 410 are located at a specific location in the frequency domain. In the illustrated embodiment, first set of physical resource channels 410 comprise a number of RBs located around the center frequency of the cell bandwidth. Second set of physical resource channels 412 may be located at any location within the cell bandwidth. In the illustrated embodiment, second set of physical resource channels 412 comprise a number of RBs located near the edges of the cell bandwidth. The transmit-receive carrier center frequency separation for second set of physical resource channels 412 is smaller than that of first set of physical resource channels 410.

A UE capable of narrowband operation, such as wireless device 110, may use first set of physical resource channels 410 to perform radio measurements of a first type during the first time period. For example, the UE may perform cell identification during the first time period. The UE may use the second set of physical resource channels 412 to perform radio measurements of a second type during the second time period. For example, the UE may perform positioning measurements during the second time period.

Figure 5:
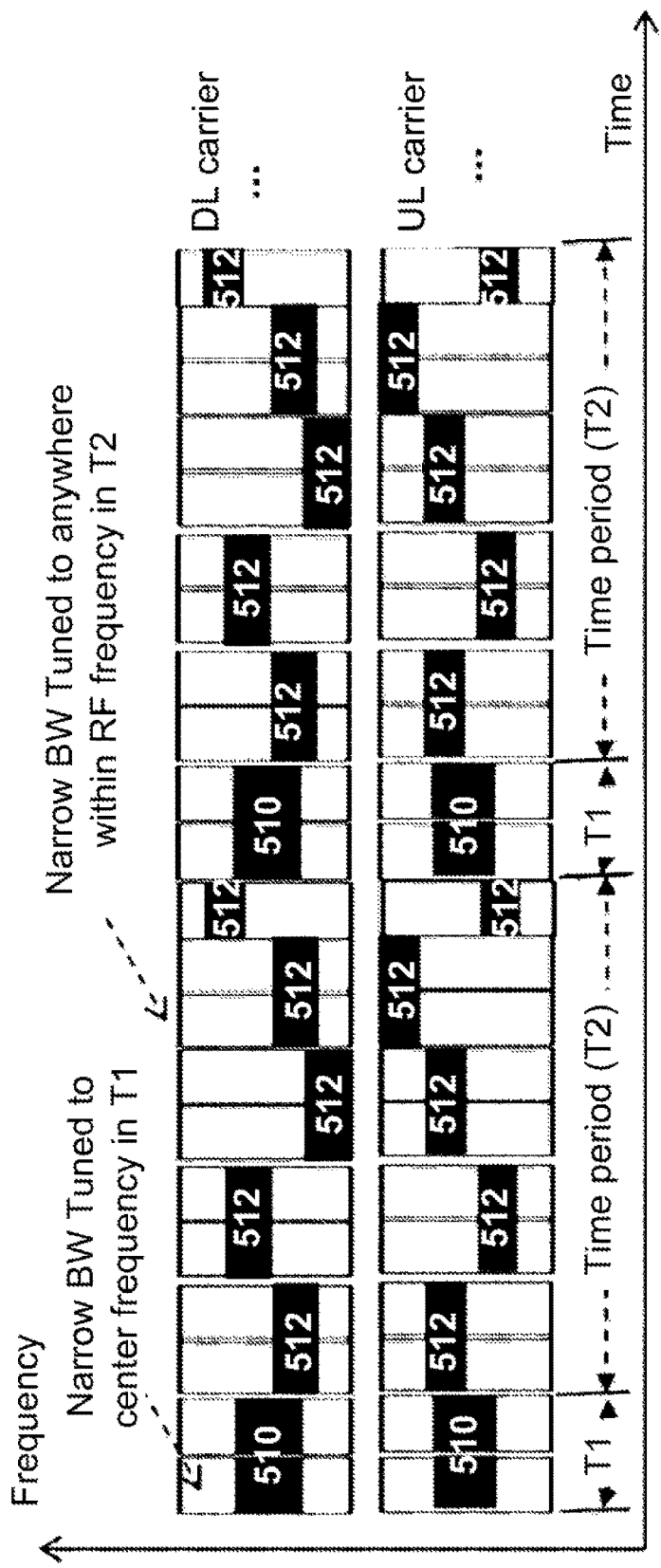
FIG. 5 is a block diagram illustrating another example measurement pattern, according to a particular embodiment.

FIG. 5 is a block diagram illustrating another example measurement pattern, according to a particular embodiment. FIG. 5 illustrates a periodic measurement pattern with two time periods T1 and T2. The pattern for T1 includes a first set of channels 510 for a first operation (e.g., RBs located around the center frequency of the cell bandwidth for assisting a UE, such as wireless device 110, in performing radio measurements). The pattern for T2 includes a second set of channels 512 located at any location within the cell bandwidth for performing a second operation (e.g., for scheduling data to the UE in uplink and/or downlink). One period of the measurement pattern includes one T1 and one T2. T1 and T2 may include one or multiple resources in the time domain. For example, as illustrated T1 includes two subframes and T2 includes nine subframes within each period of the pattern. In other embodiments, T1 and T2 may include any suitable number of time resources for performing the operations associated with the respective time period.

In particular embodiments, the measurement pattern may be expressed in terms of a bit map where 0 and 1 may represent time resources containing the first set of channels (Cnarrow1) for the first operation and the second set of channels (Cnarrow2) for the second operation. For example the measurement pattern illustrated in FIG. 5 may be expressed in terms of the bit map 11000000000 representing one period of the measurement pattern. The 1s represent, for example, subframes where RBs are assigned in the center of the system bandwidth and the 0s represent subframes where RBs are assigned anywhere within the system bandwidth.

In particular embodiments, the measurement pattern may change after every period of the measurement pattern. Different periods, however, may use the same bit map, particularly if the first operation (e.g., RSRP/RSRQ measurements performed by UE) periodically requires the same amount of signals in specific locations in the frequency domain. For example, to assist a UE in performing mobility measurements (e.g., cell search, RSRP, RSRQ, etc.) or for certain positioning measurements (e.g., UE Rx-Tx time difference measurements), the pattern may include at least two subframes with at least six central RBs every 40 ms. An example of such a pattern may be expressed in terms of the bit map 1100000000 0000000000 0000000000 0000000000. The first two subframes in a period of 40 subframes include at least six RBs in the center of the system bandwidth.

In particular embodiments, the measurement pattern may include a third time period T3 (not illustrated) within each pattern period (i.e., within the periodicity of the pattern). For example, T3 may contain a third set of physical channels (Cnarrow3) for enabling a third type of operation located at a specific location in frequency within the system bandwidth of the cell. An example of a third type of operation is performing radio measurements which cannot be performed using the first type of operation. The specific locations of the channels during T1 and T3 may be different. In particular embodiments, the measurement pattern may include a plurality of time periods with each pattern period.

Information associated with the measurement pattern may include one or more of the following:
- The pattern starting reference time (e.g., system frame number (SFN) of neighbor cell).
- The number of physical channels and/or location of physical channels within the cell bandwidth for the first and/or the second time periods.
- The distribution of time resources in T1 and T2 within the pattern density (i.e., number of subframes in T1 and in T2). For example, two consecutive subframes and thirty-eight consecutive subframes in T1 and T2 within a 40 ms period of the measurement pattern.
- The duration over which the measurement pattern applies (e.g., over one L number of measurement periods, 10 seconds, unlimited time, etc.).
- The ending time of the pattern (e.g., expressed in terms of SFN).
- Whether the pattern is periodic or aperiodic (e.g., aperiodic pattern may include only one period).
- The purpose of the pattern (e.g., T1 is used for at least performing mobility measurements, or for positioning measurements, or for several types of measurements, etc.).
- The uplink or downlink direction of the pattern. For example, whether the pattern is used for or specific to downlink, or uplink, or both uplink and downlink. In a downlink only pattern, the first set of physical channels may be assigned at a specific location for the first operation only on a downlink carrier frequency within the downlink cell bandwidth during T1. The first set of physical channels may be assigned at a different location on an uplink carrier frequency within the uplink cell bandwidth during T1. In this example, during T2 the first set of physical channels may be assigned at a specific location on uplink and downlink carrier frequencies within the uplink and downlink bandwidths, respectively.
- The cell ID (e.g., neighbor cell IDs) for which the pattern is applicable.
- The carrier frequency (e.g., EARFCN of carriers, RAT, etc.) for which the pattern is applicable. For example, the pattern may apply to a non-serving carrier frequency.
- Whether the pattern applies to all cells on a carrier frequency.
- Whether the pattern applies to all carrier frequencies configured for performing radio measurements.
- Whether the pattern used on at least one serving cell (e.g., PCell) is the same as for non-serving carrier frequencies configured for performing radio measurements.
- The frequency band for which the pattern is associated (i.e., to be applied only on a carrier belonging to a certain frequency band or to group of bands).
- Whether the cells on the same carrier using the same pattern are time aligned or not. Cells are time aligned if the transmit timing of their radio frames are time aligned within certain margin (e.g., within 13 μs). The time aligned and time misaligned cells may also be referred to as synchronous and asynchronous cells, respectively.
- An indication from neighboring cells whether the measurement pattern is to be coordinated with those of neighboring cells to reduce interference during the measurement period. The coordination refers to, for example, a first network node transmitting its pattern to one or more neighboring network nodes (e.g., eNodeB 1 sends its pattern to eNodeB 2 over X2 interface), and the neighboring network nodes (e.g., eNodeB 2) using the received pattern to adapt their own pattern, leading to reduction in interference. For example, the time period or subframes where the first set of channels is configured to enable measurements can be aligned in time between two or more network nodes. In this way the interference received from different network nodes at the UE when doing measurements can be consistent or in a predictable range.
- The minimum transmit-receive separation as a parameter (pre-defined or configurable). Two or more can be pre-defined and the network can configure one. The parameter may also depend on transmit power level.

A UE may receive measurement pattern information from a network node.

Figure 6:
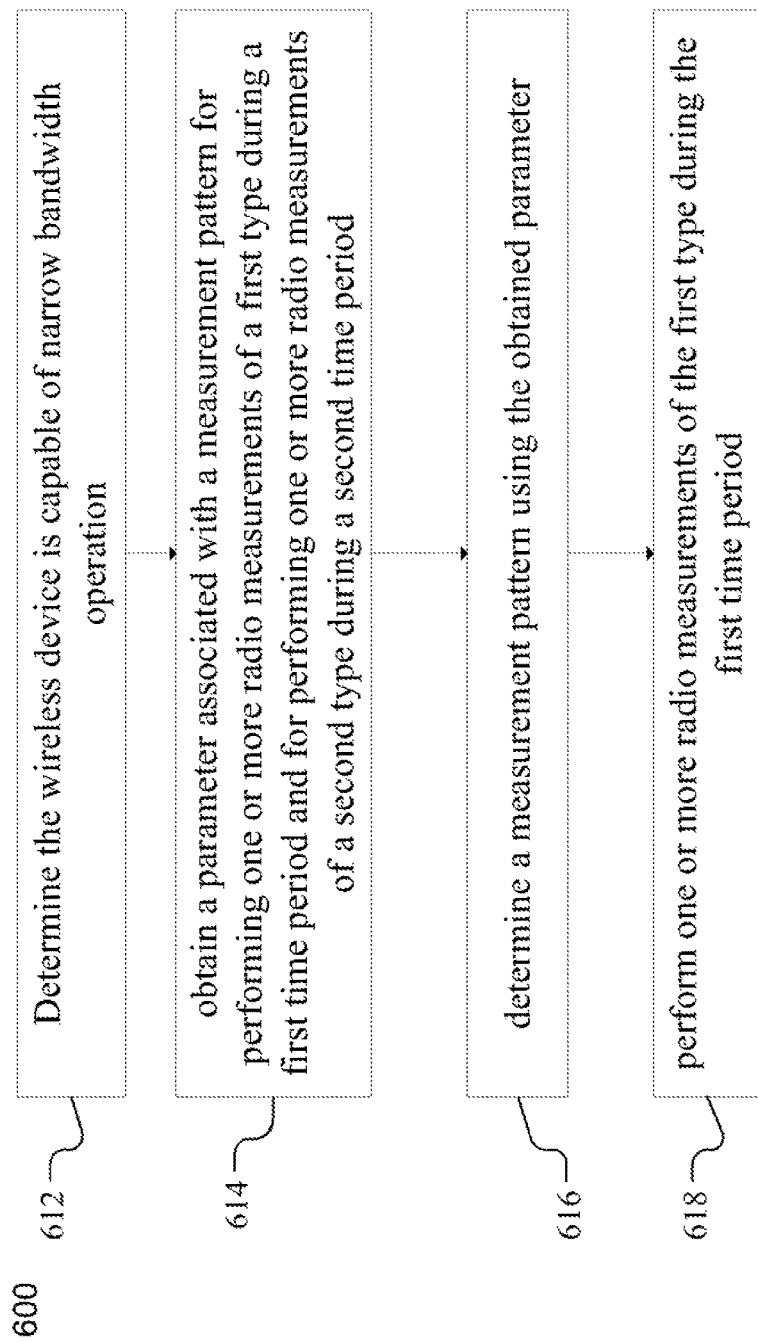
FIG. 6 is a flowchart of an example method in a wireless device of performing radio measurement using a particular measurement pattern, according to a particular embodiment.

FIG. 6 is a flowchart of an example method in a wireless device of performing radio measurement using a particular measurement pattern, according to a particular embodiment. In particular embodiments, one or more steps of method 600 may be performed by components of network 100 described with reference to FIGS. 3-9B.

The method begins at step 612, where a wireless device determines it is capable of narrow bandwidth operation. For example, wireless device 110 may determine it is capable of narrow bandwidth operation using a subset of six PRBs of the total system bandwidth for uplink and downlink.

In particular embodiments, the wireless device determines it is capable of narrow bandwidth operation based on a stored capability configuration in its memory. In some embodiments, the wireless device may be configured for narrow bandwidth operation (e.g., configured with parameters Cnarrow and (δf) described above). The wireless device may determine this based on a configuration message received from a network node.

In some embodiments, the wireless device determines it is capable of narrow bandwidth operation based on how it performs or is configured to perform one or more radio measurements (e.g., RSRP) on at least one cell of the serving carrier frequency. For example, the wireless device can determine this based on the activity of its measurement unit, measurement configuration message received from the network node, etc. The measurement configuration message triggers the wireless device to perform measurements indicated in the message.

At step 614, the wireless device obtains a parameter associated with a measurement pattern for performing one or more radio measurements of a first type during a first time period and for performing one or more radio measurements of a second type during a second time period. For example, wireless device 110 may receive a parameter (such as parameters associated with T1 or T2 described in reference to FIG. 5) from network node 120.

In particular embodiments, a UE obtains information about at least one measurement pattern (e.g., a first measurement pattern) for performing one or more measurements of a first type. The first type of radio measurements may be performed by the UE on the same or different radio signals, which are transmitted within the same set of physical channels within the system bandwidth. For example, RSRP, RSRQ, and cell identification are examples of the first type of radio measurements because they all can be performed in the six central RBs within the system bandwidth of the cell.

A wireless device may obtain a parameter associated with a measurement pattern in a variety of ways. In some embodiments, the pattern may be specified or pre-defined in a standards document. The wireless device may store at least part of the pattern information and retrieve it from its memory when the wireless device needs to use the measurement pattern.

In some embodiments, the parameter may be configured by a network node. The wireless device may receive at least part of the pattern information from the network node for using the measurement pattern. Some embodiments may combine these two mechanisms by obtaining certain parameters based on pre-defined information and the remaining ones based on information received from a network node.

Some embodiments may use historical data or statistics. The wireless device may use statistics or information about the measurement pattern used in the past for determining one or more parameters associated with the pattern.

The following examples further illustrate various ways of obtaining a parameter associated with a measurement pattern. In particular embodiments, the wireless device obtains the pattern periodicity or sequence from the network node (e.g., periodicity of 40 ms). The wireless device obtains the remaining parameters from pre-defined information. For example, the pattern starting time may be pre-defined as SFN 0. In particular embodiments, the pattern periodicity as well as some of the other parameters (e.g., pattern starting time, such as SFN=64) may be signaled by the network node to another network node or the UE.

In particular embodiments, the pattern periodicity as well as some of the other parameters may be aligned in time with a paging occasion pattern which may be derived from a UE ID. For example, the measurement pattern may be adapted to align the first time period (i.e., when measurement can be performed) within the measurement pattern periodicity and/or the measurement pattern periodicity with the paging occasion (e.g., ON duration of the discontinuous receive (DRX) cycle in idle mode).

In particular embodiments, the pattern periodicity as well as some of the other parameters may be aligned with a system information broadcast pattern (e.g., periodicity with which PBCH and/or PDSCH containing system information block (SIB) is transmitted). For example, the measurement pattern may be adapted to align the first time period (i.e., when measurement can be performed) within the measurement pattern periodicity and/or the measurement pattern periodicity with the time instance or duration when the broadcast information is or can be transmitted in the cell.

In particular embodiments, the pattern periodicity as well as some of the other parameters may be aligned with a DRX cycle. For example, the measurement pattern may be adapted to align the first time period (i.e., when measurement can be performed) within the measurement pattern periodicity and/or the measurement pattern periodicity with the ON duration of the DRX cycle. In other embodiments, the ON duration of the DRX cycle can be aligned with the first time period (i.e., when measurement can be performed) within the pattern periodicity and/or the measurement pattern periodicity. For example if DRX cycle is 40 ms and DRX ON duration is 5 ms, then the network node may create a pattern with 40 ms periodicity and a T1 period of at least 1 ms overlapping with the DRX ON duration.

In particular embodiments, a wireless device obtains information about a second measurement pattern for performing one or more measurements of a second type. The second type of radio measurements are also performed by the UE on the same or different radio signals, which are transmitted within the same set of physical channels within the system bandwidth. The set of physical channels required for the first and the second type of radio measurements, however, may be different. OTDOA RSTD is an example of a second type of radio measurement, which can be performed in the six or more RBs containing PRS signals in the low or upper part of the system bandwidth of the cell.

At step 616, the wireless device determines a measurement pattern using the obtained parameter. For example, wireless device 110 may determine a measurement pattern, such as the measurement patterns described with respect to FIGS. 4 and 5, based on the parameter received from network node 120.

In particular embodiments, the obtained parameter may completely specify a measurement pattern. In some embodiments, the wireless device may combine the obtained parameter with other pre-defined or calculated information to determine the complete measurement pattern. For example, the assignment of PRBs may be obtained from the network node but the periodicity of the measurement pattern may be pre-defined. In particular embodiments, the wireless device may use the obtained parameter and the determination that the wireless device is capable of narrowband operation to determine the measurement pattern.

At step 618, the wireless device performs one or more radio measurements of the first type during the first time period. For example, wireless device 110 may perform cell identification during the time period and using the PRBs specified in the first pattern.

In particular embodiments, a UE may configure its radio receiver and/or radio transmitter for receiving and transmitting signals, respectively, according to the first and second set of channels for different operations in different time periods (e.g., T1 and T2) within the pattern. The UE may further determine if it is performing or is expected to perform one or more radio measurements on downlink and/or uplink signals. If the UE is expected to perform radio measurements, then the UE tunes its receiver and/or transmitter to receive and transmit the first set of physical channels for the measurements during the relevant time period (i.e., during the time period when the first set of physical channels can be received for performing measurements).

For example, during particular subframes (e.g., 2 out of 50 subframes) within the pattern period, the UE will tune its receiver to receive six RBs in the center of the downlink cell bandwidth (e.g., 50 RBs) and perform measurements (e.g., RSRP, RSRQ, etc.) assuming the first set of channels is six central RBs. The UE may perform measurements on one or more cells on the same carrier during these subframes (e.g., on serving cell and one or more neighbor cells, or on one or more neighbor cells, etc.).

As another example, during particular subframes within the pattern period, the UE will tune its receiver to receive twenty-five RBs in the center of the DL cell BW (e.g., 50 RBs) and perform measurements (e.g., RSRP, RSRQ, etc.) assuming the first set of channels is twenty-five central RBs. The UE may perform measurements on one or more cells on the same carrier during these subframes (e.g., on serving cell and one or more neighbor cells, or on one or more neighbor cells, etc.).

In particular embodiments, after performing one or more radio measurements, the UE may use the measurements for one or more radio resource management (RRM) tasks. Examples of RRM tasks include using the measurements for cell selection, cell reselection, cell change, storing or logging the results in memory, reporting the measurement results to the network node (e.g., to its serving network node), etc.

Modifications, additions, or omissions may be made to the method of FIG. 6. Additionally, one or more steps in the method of FIG. 6 may be performed in parallel or in any suitable order. The method may be repeated as necessary over time.

Figure 7:
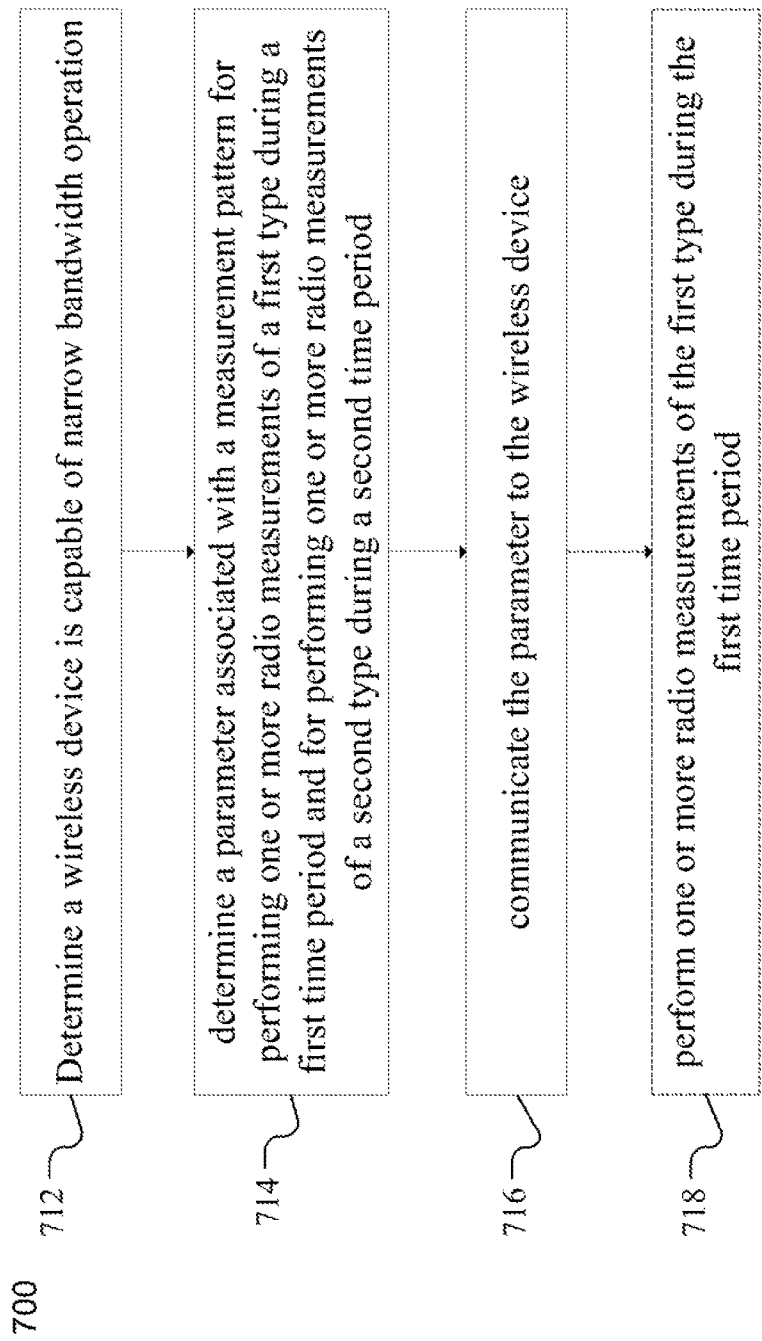
FIG. 7 is a flowchart of an example method in a network node of determining a measurement pattern, according to a particular embodiment.

FIG. 7 is a flowchart of an example method in a network node of determining a measurement pattern, according to a particular embodiment. In particular embodiments, one or more steps of method 700 may be performed by components of network 100 described with reference to FIGS. 3-9B.

The method begins at step 712, where a network node determines a wireless device is capable of narrow bandwidth operation. For example, network node 120 may determine that wireless device 110 is capable of narrow bandwidth operation.

In particular embodiments, the network node determines a need to configure one or more measurement patterns for enabling a wireless device to perform one or more measurements of at least the first type (as described with respect to FIGS. 4 and 5). Determining the need for configuring one or more measurement patterns may be triggered by one or more criteria or conditions.

For example, the network node may detect the presence of at least one wireless device capable of narrow bandwidth operation in the cell served by the network node (e.g., based on UE capability information received from a UE). In another example, the network node determines it has configured a wireless device for narrow band operation by sending or preparing to send such a configuration message to the wireless device (e.g., configuring the wireless device with parameters (Cnarrow and (δf) described above).

As another example, the network node can detect that a UE capable of narrow bandwidth operation or configured with narrow bandwidth operation is performing or expected to perform one or more radio measurements (e.g., RSRP) on at least one cell of the serving carrier frequency. In particular embodiments, the network node may determine this based on the measurement configuration message transmitted or expected to be transmitted the UE.

As another example, the network node may determine that it is performing or expected to perform one or more radio measurements (e.g., uplink SINR, eNodeB Rx-Tx time difference) on at least uplink signals transmitted by the UE capable of narrow bandwidth operation or configured with narrow bandwidth operation. In particular embodiments, the network node may determine this based on the activity of its measurement unit, the measurement configuration used by the network node for doing such measurements, etc.

At step 714, the network node determines a parameter associated with a measurement pattern for performing one or more radio measurements of a first type during a first time period and for performing one or more radio measurements of a second type during a second time period. For example, network node 120 determines a parameter associated with a measurement pattern (such as parameters associated with T1 and T2 described in reference to FIG. 5) for wireless device 110 to perform an operation, such as performing cell identification.

In particular embodiments, upon triggering a need to determine one or more measurement patterns, the network node creates, determines, or generates the corresponding measurement patterns. The creation of the pattern may comprise selecting one or more parameters or attributes associated with the patterns. The parameters or attributes are described above in relation to FIGS. 4 and 5. Some parameters may be pre-defined while others may be determined by the network node. Each pattern includes at least two time periods (T1 and T2), a first set of channels for at least the first operation during T1, and pattern repetition periodicity or sequence. Examples of criteria for selecting one or more parameters of the patterns are given below.

For example, when selecting pattern parameters, the network node may consider the amount of resources or physical channels (e.g., subframes, RBs) required for scheduling the UE with data in uplink and/or downlink time resources. If the UE is to be scheduled a large amount of data, then the network node may select a T2 that is considerably longer than T1 (e.g., T1 and T2 may comprise 1 subframe and 19 subframes, respectively).

As another example, when selecting pattern parameters, the network node may consider the amount of resources or physical channels (e.g., subframes, RBs) required for one or more measurements being performed or to be performed by the UE on at least downlink signals and/or by the network node on signals transmitted by the UE. In particular embodiments, the duration of T1 may depend on an amount and frequency of the measurement samples or snapshots required by the UE and/or the network node for performing the measurements (e.g., for a longer sample, T1 and T2 may comprise 2 subframes and 28 subframes, respectively; for a more frequent sample, T1 and T2 may comprise 2 subframes and 18 subframes, respectively).

As another example, when selecting pattern parameters, the network node may consider the type of measurements being performed or to be performed by the UE on at least downlink signals and/or by the network node on signals transmitted by the UE. Examples of the type of measurements include mobility measurements (e.g., cell search, RDM, RSRP, etc.) and positioning measurements (e.g., RSTD). If the measurements are performed on signals to be transmitted in the central RBs of the carrier bandwidth of the cell, then the network node may select a pattern where at least the required number of RBs (e.g., at least six RBs) are transmitted in uplink and/or downlink in the center of the cell bandwidth.

In particular embodiments, the network node may determine a parameter associated with a measurement pattern for performing one or more radio measurements of a second type during a second time period. For example, network node 120 determines a parameter associated with a measurement pattern (such as parameters associated with T2 described in reference to FIG. 5) for wireless device 110 to perform a second operation, such as a positioning measurement.

At step 716, the network node communicates the parameter to the wireless device. For example, network node 120 may communicate the parameter to wireless device 110.

In particular embodiments, the network node may transmit information related to the determined one or more measurement patterns to a UE. The information may comprise one or more of pre-defined identifiers of the determined patterns, one or more parameters associated with or defining the determined patterns, etc. The network node may signal the information related to the determined measurement patterns via RRC signaling or via MAC signaling. The network node may signal the information in a broadcast channel (e.g., PDSCH, PBCH, etc.), or in a UE specific or dedicated message (e.g., via PDSCH). The information related to the determined measurement patterns may be signaled to a UE in any RRC connected state (e.g., RRC idle state, RRC connected state, etc.). The information related to the determined measurement patterns may also be signaled to the UE for performing inter-RAT measurements (e.g., HSPA RNC requesting the UE to measure on one or more cells of E-UTRA carrier(s)).

In particular embodiments, the network node may transmit information related to the determined one or more measurement patterns to one or more other network nodes. Examples of other network nodes include neighboring network node such as BS, eNodeB, RNC, BSC, core network node such as MME, etc.

At optional step 718, the network node performs one or more radio measurements of the first type during the first time period. For example, network node 120 may measure an uplink signal from wireless device 110. In particular embodiments, the network node may use or apply the determined measurement pattern(s) for performing one or more radio operations or tasks or procedures.

In particular embodiments, the network node may at least partly adapt its transceiver (i.e., radio transmitter and/or radio receiver) according to the measurement pattern. For example, the network node may adjust its transceiver according to the first set of channels for the first type of operation (e.g., measurements) in T1 and according to the first set of channels for the first type of operation (e.g., data scheduling) in T2. This will enable the network node to transmit and/or receiver signals according to the pattern, to perform measurements, etc. Adapting the transceiver may include changing transmitter power allocated for a given transmit-receive frequency separation.

In particular embodiments, the network node may adapt the scheduling of data in uplink and/or downlink based on the determined patterns. For example, the network node may schedule the data for uplink transmission and downlink transmission on uplink time resources and downlink time resources, respectively, during at least time period T2 of the determined patterns. The network node may schedule the UE during T1 if there are available resources. The scheduling information acquired by the UE may be used by the UE for transmission on the uplink and reception on the downlink.

Modifications, additions, or omissions may be made to the method of FIG. 7. Additionally, one or more steps in the method of FIG. 7 may be performed in parallel or in any suitable order. The method may be repeated as necessary over time.

In particular embodiments, a wireless device may signal its capability related to obtaining and applying measurement pattern(s) associated within narrow bandwidth operation. For example, a UE may signal capability information to another node (a network node such as base station, eNodeB, relay, core network (MME), another UE capable of D2D operation, etc.) to inform the other node whether the UE is capable of acquiring and using or applying information related to one or more measurement patterns for use under narrow bandwidth operation. As a particular example, the UE capability information may indicate whether the UE is capable of obtaining and using at least one measurement pattern comprising at least two time periods, wherein the first and the second time periods contain first set of physical channels (Cnarrow1) for enabling a first type of operation located at a specific location in frequency within the system bandwidth of the cell, and a second set of physical channels (Cnarrow2) for a second type of operation located at any frequency location within the system bandwidth of the cell. Generally, the UE may indicate whether it has the capability to obtain one or more parameters related to the measurement pattern(s) and use them to determine the complete pattern and use the determined pattern for at least performing one radio measurements during the first time period. The capability information may indicate whether the UE is capable of any of the procedures described above with respect to FIGS. 3-7.

In particular embodiments, the capability information may be sent via higher layer signaling (e.g., RRC signaling) to the network node. The information may be sent during initial call setup, after cell change (e.g., handover, etc.), or during the session or call.

In particular embodiments, examples of capability information include: (1) whether the wireless device is capable of autonomously determining the measurement patterns (e.g., based on pre-defined parameters and/or rules); (2) whether the wireless device is capable of determining or selecting the measurement patterns based on information or indication received from the network node; (3) whether the wireless device is capable of determining the measurement patterns based on any combination of information received from the network node and/or another UE, pre-defined parameters and/or rules, and autonomous determination by the UE; (4) the frequency bands for which the wireless device is capable of performing any one or more of the operations described herein; and (5) the type of radio measurements the wireless device is capable of performing.

In particular embodiments, a network node (e.g., eNodeB, base station, etc.) may use the acquired UE capability information for performing one or more radio operation tasks or network management tasks. For example, the network node may forward the received UE capability information to another network node which may use it after cell change of the UE. A network node may store the received capability information for future use (e.g., when the network node serves the same UE in the future and the UE performs measurements under narrow bandwidth operation).

In particular embodiments, the network node may determine, based on the received information, whether to configure or signal any information or type of information related to the determined measurement pattern(s) to assist the UE in performing one or more radio measurements under narrow bandwidth operation. For example, if the UE needs to receive the measurement pattern because the UE cannot determine all the parameters autonomously or based on pre-defined rule, then the network node determines one or more parameters, or all the parameters of the patterns, (e.g., as described with reference to FIGS. 4 and 5) and signals the determined pattern(s) and/or associated parameters to the UE.

Figure 8A:
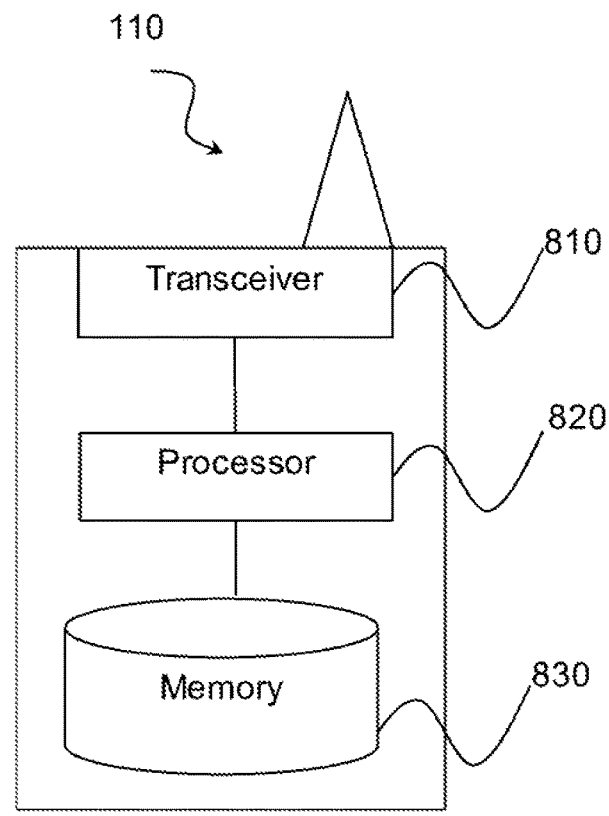
FIG. 8A is a block diagram illustrating an example embodiment of a wireless device.

FIG. 8A is a block diagram illustrating an example embodiment of a wireless device. The wireless device is an example of the wireless devices 110 illustrated in FIG. 3. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 810, processor 820, and memory 830. In some embodiments, transceiver 810 facilitates transmitting wireless signals to and receiving wireless signals from network node 120 (e.g., via an antenna), processor 820 executes instructions to provide some or all of the functionality described herein as provided by the wireless device, and memory 830 stores the instructions executed by processor 820.

Processor 820 includes any suitable combination of hardware and software implemented in one or more integrated circuits or modules to execute instructions and manipulate data to perform some or all of the described functions of the wireless device. Memory 830 is generally operable to store computer executable code and data. Examples of memory 830 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 820 in communication with transceiver 810 may determine whether wireless device 110 is capable of narrowband operation; may obtain parameters, from network node 120 or memory 830, associated with a measurement pattern; may determine a measurement pattern based on the received parameters; and may measure or acquire wireless radio signals. For example, processor 820 in communication with transceiver 810 may perform the steps of method 600 illustrated in FIG. 6.

Other embodiments of the wireless device may include additional components (beyond those shown in FIG. 8A) responsible for providing certain aspects of the wireless device's functionality, including any of the functionality described above and/or any additional functionality (including any functionality necessary to support the solution described above).

Figure 8B:
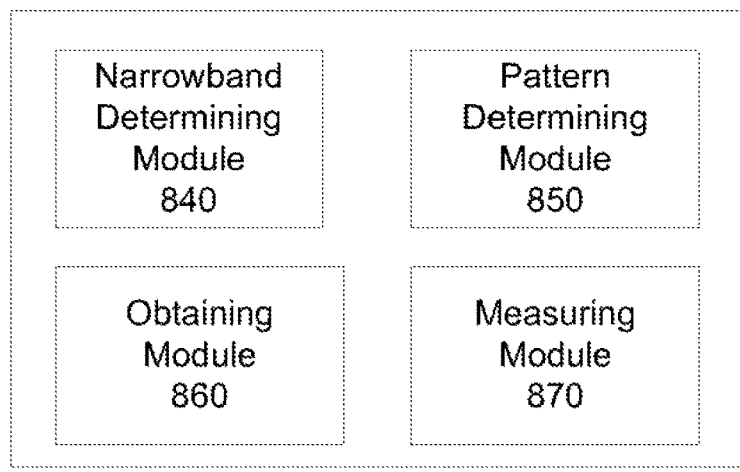
FIG. 8B is a block diagram illustrating example components of a wireless device.

FIG. 8B is a block diagram illustrating example components of a wireless device. The components may include narrowband determining module 840, pattern determining module 850, obtaining module 860, and measuring module 870.

Narrowband determining module 840 may perform the narrowband determining functions of wireless device 110. For example, narrowband determining module 840 may determine whether wireless device 110 is capable of narrowband operation. In certain embodiments, narrowband determining module 840 may include or be included in processor 820. Narrowband determining module 840 may include circuitry configured to receive radio signals. In particular embodiments, narrowband determining module 840 may communicate with pattern determining module 850, obtaining module 860, and measuring module 870.

Obtaining module 860 may perform the parameter obtaining functions of wireless device 110. For example, obtaining module 860 may obtain measurement parameters from network node 120, or may obtain measurement parameters stored in memory 830. In certain embodiments, obtaining module 860 may include or be included in processor 820. Obtaining module 860 may include circuitry configured to receive radio signals. In particular embodiments, obtaining module 860 may communicate with pattern determining module 850, narrowband determining module 840, and measuring module 870.

Pattern determining module 850 may perform the measurement pattern determining functions of wireless device 110. For example, pattern determining module 850 may determine measurement patterns based on parameters received from network node 120 or stored in memory 830. In certain embodiments, pattern determining module 850 may include or be included in processor 820. In particular embodiments, pattern determining module 850 may communicate with narrowband determining module 840, obtaining module 860, and measuring module 870.

Measuring module 870 may perform the measuring functions of wireless device 110. For example, measuring module 870 may measure wireless signals according to a determined measurement pattern. In certain embodiments, measuring module 870 may include or be included in processor 820. Measuring module 870 may include circuitry configured to receive radio signals. In particular embodiments, measuring module 870 may communicate with pattern determining module 850, narrowband determining module 840, and obtaining module 860.

Figure 9A:
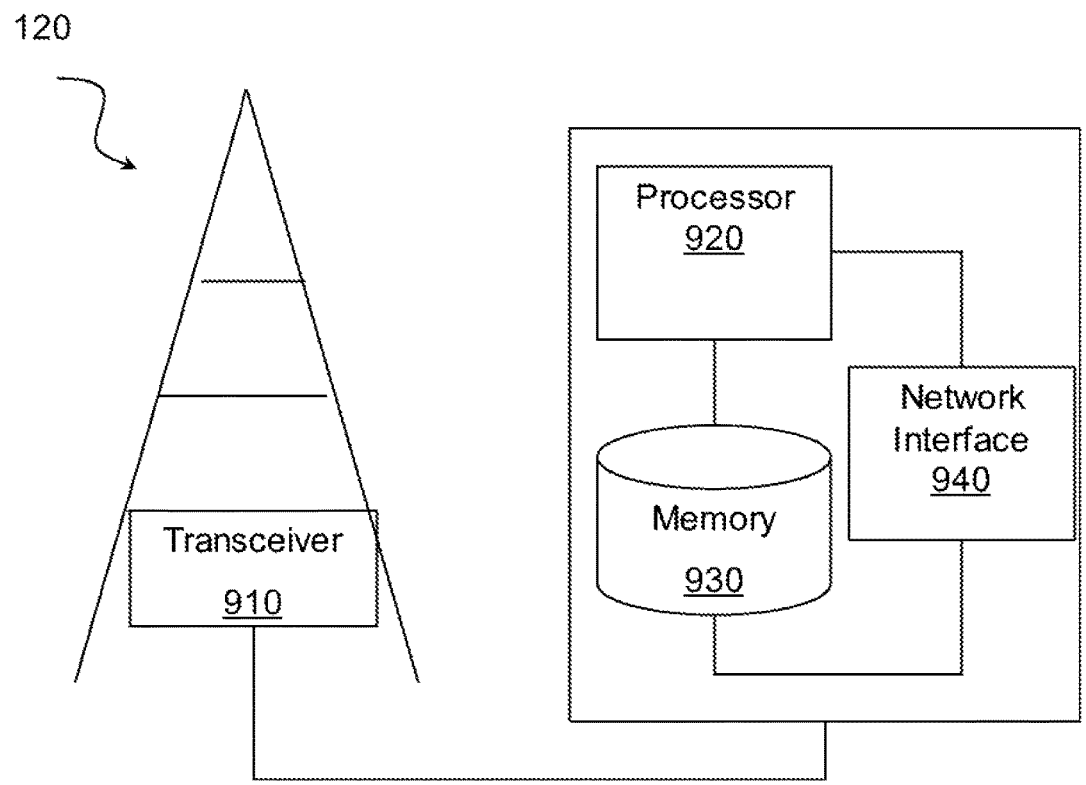
FIG. 9A is a block diagram illustrating an example embodiment of a network node.

FIG. 9A is a block diagram illustrating an example embodiment of a network node. Network node 120 can be an eNodeB, a node B, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 910, at least one processor 920, at least one memory 930, and at least one network interface 940. Transceiver 910 facilitates transmitting wireless signals to and receiving wireless signals from a wireless device, such as wireless devices 110 (e.g., via an antenna); processor 920 executes instructions to provide some or all of the functionality described above as being provided by network node 120; memory 930 stores the instructions executed by processor 920; and network interface 940 communicates signals to backend network components, such as a gateway, switch, router, Internet, Public Switched Telephone Network (PSTN), controller, and/or other network nodes 120. Processor 920 and memory 930 can be of the same types as described with respect to processor 820 and memory 830 of FIG. 8A above.

In some embodiments, network interface 940 is communicatively coupled to processor 920 and refers to any suitable device operable to receive input for network node 120, send output from network node 120, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network.

In particular embodiments, processor 920 in communication with transceiver 910 may determine whether wireless device 110 is capable of narrowband operation: may determine measurement parameters, for wireless device 110, associated with a measurement pattern; may communicate the measurement parameters to wireless device 110; and may measure or acquire wireless radio signals. For example, processor 920 in communication with transceiver 910 may perform the steps of method 700 illustrated in FIG. 7.

Other embodiments of network node 120 include additional components (beyond those shown in FIG. 9A) responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 9B:
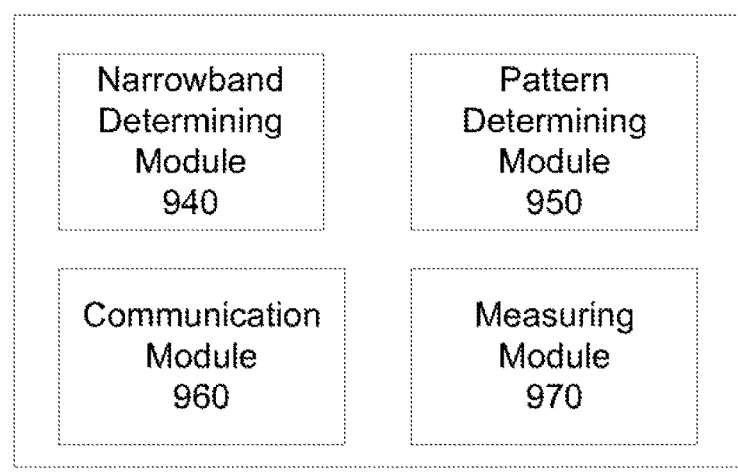
FIG. 9B is a block diagram illustrating example components of a network node.

FIG. 9B is a block diagram illustrating example components of a network node. The components may include narrowband determining module 940, pattern determining module 950, communication module 960, and measuring module 970.

Narrowband determining module 940 may perform the narrowband determining functions of network node 120. For example, narrowband determining module 940 may determine whether wireless device 110 is capable of narrowband operation. In certain embodiments, narrowband determining module 940 may include or be included in processor 920. Narrowband determining module 940 may include circuitry configured to receive radio signals. In particular embodiments, narrowband determining module 940 may communicate with pattern determining module 950, communication module 960, and measuring module 970.

Pattern determining module 950 may perform the measurement pattern determining functions of network node 120. For example, pattern determining module 950 may determine measurement patterns for use with wireless device 110. In certain embodiments, pattern determining module 950 may include or be included in processor 920. In particular embodiments, pattern determining module 950 may communicate with narrowband determining module 940, communication module 960, and measuring module 970.

Communication module 960 may perform the communication functions of network node 120. For example, communication module 960 may communicate measurement parameters to wireless device 110. In certain embodiments, communication module 960 may include or be included in processor 920. Communication module 960 may include circuitry configured to transmit and receive radio signals. In particular embodiments, communication module 960 may communicate with pattern determining module 950, narrowband determining module 940, and measuring module 970.

Measuring module 970 may perform the measuring functions of network node 120. For example, measuring module 970 may measure wireless signals received from wireless device 110 according to a determined measurement pattern. In certain embodiments, measuring module 970 may include or be included in processor 920. Measuring module 970 may include circuitry configured to receive radio signals. In particular embodiments, measuring module 970 may communicate with pattern determining module 950, narrowband determining module 940, and communication module 960.

Some embodiments of the disclosure may provide one or more technical advantages. In particular embodiments, a particular measurement pattern for use in narrowband operation that comprises at least two time periods facilitates network node assigning sufficient radio resources for performing both uplink and downlink radio measurements and for scheduling data transmission to a wireless device. A wireless device receives sufficient measurement opportunities based on guaranteed resources for measurement during a particular time period of each measurement pattern period. In this way, mobility and positioning performance are not degraded when the wireless device operates using a narrower bandwidth than the system bandwidth and where the narrower bandwidth is not necessarily in the center of the cell bandwidth.

The pattern for the first time period comprises a first set of physical channels located at a specific location within the system bandwidth (e.g., six resource blocks centered in the system bandwidth). Thus, even if an MTC wireless device is typically operating at narrow bandwidths near the edge of the system bandwidth with a small transmit-receive frequency separation, the narrow bandwidth MTC wireless device will have at least one measurement period (i.e., the first measurement period) where it can perform measurements in narrow bandwidths located at a fixed location with improved performance characteristics (e.g., when the narrow bandwidth is centered in the system bandwidth then the transmit-receive frequency separation is equal to the system transmit-receive frequency separation).

The pattern for the second time period may comprise a second set of physical channels located at any location within the system bandwidth. The MTC wireless device may use the second time period to measure other reference signals or to transmit and receive data.

Accordingly, a MTC wireless device configured for narrow bandwidth operation anywhere in the system bandwidth may also be configured with a measurement pattern where at least certain resources are periodically tuned at a specific location (e.g., the six resource blocks at the center of the system bandwidth) within the system bandwidth in the frequency domain. This enables the MTC wireless device to perform radio measurements at regular intervals which in turn enables robust mobility performance even under narrow bandwidth operation.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP 3rd Generation Partnership Project
BS Base Station
BLER Block Error Ratio
BSC Base Station Controller
BW Bandwidth
CA Carrier Aggregation
CDMA2000 Code division multiple access 2000
CRS Cell-Specific Reference Signal
CSI Channel State Information
CSI-RS Channel State Information Reference Symbols
D2D Device-to-Device
DL Downlink
DMRS Demodulation Reference Symbols
DRS Discovery Reference Signal
DRX Discontinuous Reception
eNB Enhanced Node-B
E-UTRAN Evolved universal terrestrial radio access network
E-UTRA Evolved universal terrestrial radio access
FDD Frequency Division Duplex
GSM Global System for Mobile communication
HSPA High Speed Packet Access
LAN Local Area Network
LTE Long Term Evolution
M2M Machine-to-Machine
MAC Media Access Control
MAN Metropolitan Area Network
MIMO Multi-Input Multi-Output
MTC Machine Type Communication
OTDOA Observed Time Difference of Arrival
PCell Primary Cell
PCI Physical Cell Identifier
PRS Positioning Reference Signals
PSC Primary Serving Cell
PSTN Public Switched Telephone Network
PSS Primary Synchronization Signal
RAT Radio Access Technology
RE Resource Element
RB Resource Block
RIP Received Interference Power
RLM Radio Link Management
RNC Radio Network Controller
RRC Radio Resource Control
RRM Radio Resource Management
RSRP Reference Signal Received Power
RSRQ Reference Symbol Received Quality
RSTD Reference Signal Time Difference
SCell Secondary Cell
SINR Signal-to-Interference-plus-Noise Ratio
SNR Signal-to-Noise Ratio
SSC Secondary Serving Cell
SSS Secondary Synchronization Signal
TA Time Advance
UE User Equipmen
UL Uplink
UMTS Universal Mobile Telecommunications System
UTRA Universal Terrestrial Radio Access
WLAN Wireless Local Area Network
WAN Wide Area Network
WiMAX Worldwide Interoperability for Microwave Access

The invention claimed is:

1. A method in a wireless device of a wireless communication network, the wireless device capable of narrow bandwidth operation, narrow bandwidth operation comprising transmitting and receiving wireless signals using a number of physical resource channels that is less than a total number of physical resource channels supported by the wireless communication network and using a transmit-receive frequency separation that is less than a transmit-receive frequency separation of a total bandwidth of the wireless communication network, the method comprising:
  obtaining a measurement pattern, the measurement pattern comprising:
    a first time period and a second time period;
    one or more radio measurements of a first type to be performed during the first time period on one or more radio signals transmitted in a first set of physical resource channels;
    one or more radio measurements of a second type to he performed during the second time period on one or more radio signals transmitted in a second set of physical resource channels, at least one physical resource channel of the second set of physical resource channels different than the physical resource channels of the first set of physical resource channels; and
  performing one or more radio measurements of the first type during the first time period according to the measurement pattern.

2. The method of Claim 1, wherein the first set of physical resource channels comprises a first number of physical resource channels, the first number of physical resource channels less than the total number of physical resource channels supported by the wireless communication network.

3. The method of claim 1, wherein the first set of physical resource channels are located at a specific frequency location within the bandwidth of the wireless communication system and the second set of physical resource channels are located at any frequency location within the bandwidth of the wireless communication system.

4. The method of claim 3, wherein the first set of physical resource channels is located at the center of the bandwidth of the wireless communication system.

5. The method of claim 1, wherein the first set of physical resource channels comprises six physical resource blocks.

6. The method of claim 1, wherein the first time period overlaps with an ON duration of a discontinuous receive cycle of the wireless device.

7. A method in a network node of a wireless communication network, the method comprising:
  determining a wireless device is capable of narrow bandwidth operation, narrow bandwidth operation comprising transmitting and receiving wireless signals using a number of physical resource channels that is less than a total number of physical resource channels supported by the wireless communication network and using a transmit-receive frequency separation that is less than a transmit-receive frequency separation of a total bandwidth of the wireless communication network;

determining a measurement pattern, the measurement pattern comprising:

a first time period and a second time period;

one or more radio measurements of a first type to be performed during the first time period on one or more radio signals transmitted in a first set of physical resource channels;

one or more radio measurements of a second type to be performed during the second time period on one or more radio signals transmitted in a second set of physical resource channels, at least one physical resource channel of the second set of physical resource channels different than the physical resource channels of the first set of physical resource channels; and communicating the measurement pattern to the wireless device.

8. The method of claim 7, wherein the first set of physical resource channels comprises a first number of physical resource channels, the first number of physical resource channels less than the total number of physical resource channels supported by the wireless communication network.

9. The method of claim 7, wherein the first set of physical resource channels are located at a specific frequency location within the bandwidth of the wireless communication system and the second set of physical resource channels are located at any frequency location within the bandwidth of the wireless communication system.

10. The method of claim 9, wherein the first set of physical resource channels is located at the center of the bandwidth of the wireless communication system.

11. The method of claim 7, wherein the first set of physical resource channels comprises six physical resource blocks.

12. The method of claim 7, wherein the first time period overlaps with an ON duration of a discontinuous receive cycle of the wireless device.

13. A wireless device capable of narrow bandwidth operation, narrow bandwidth operation comprising transmitting and receiving wireless signals using a number of physical resource channels that is less than a total number of physical resource channels supported by a wireless communication network and using a transmit-receive frequency separation that is less than a transmit-receive frequency separation of a total bandwidth of the wireless communication network, the wireless device comprising:

a processor coupled to a memory;

the memory comprising instructions;

the instructions, when executed by the processor, are operable to:

obtain a measurement pattern, the measurement pattern comprising:

a first time period and a second time period;

one or more radio measurements of a first type to be performed during the first time period on one or more radio signals transmitted in a first set of physical resource channels;

one or more radio measurements of a second type to be performed during the second time period on one or more radio signals transmitted in a second set of physical resource channels, at least one physical resource channel of the second set of physical resource channels different than the physical resource channels of the first set of physical resource channels; and perform one or more radio measurements of the first type during the first time period according to the measurement pattern.

14. The wireless device of claim 13, wherein the first set of physical resource channels comprises a first number of physical resource channels, the first number of physical resource channels less than the total number of physical resource channels supported by the wireless communication network.

15. The wireless device of claim 13, wherein the first set of physical resource channels are located at a specific frequency location within the bandwidth of the wireless communication system and the second set of physical resource channels are located at any frequency location within the bandwidth of the wireless communication system.

16. The wireless device of claim 15, wherein the first set of physical resource channels is located at the center of the bandwidth of the wireless communication system.

17. The wireless device of claim 13, wherein the first set of physical resource channels comprises six physical resource blocks.

18. The wireless device of claim 13, wherein the first time period overlaps with an ON duration of a discontinuous receive cycle of the wireless device.

19. A network node comprising:

a processor coupled to a memory;

the memory comprising instructions;

the instructions, when executed by the processor, are operable to:

determine a wireless device is capable of narrow bandwidth operation, narrow bandwidth operation comprising transmitting and receiving wireless signals using a number of physical resource channels that is less than a total number of physical resource channels supported by the wireless communication network and using a transmit-receive frequency separation that is less than a transmit-receive frequency separation of a total bandwidth of the wireless communication network;

determine a measurement pattern, the measurement pattern comprising:

a first time period and a second time period;

one or more radio measurements of a first type to be performed during the first time period on one or more radio signals transmitted in a first set of physical resource channels;

one or more radio measurements of a second type to be performed during the second time period on one or more radio signals transmitted in a second set of physical resource channels, at least one physical resource channel of the second set of physical resource channels different than the physical resource channels of the first set of physical resource channels; and communicate the measurement pattern to the wireless device.

20. The network node of claim 19, wherein the first set of physical resource channels comprises a first number of physical resource channels, the first number of physical resource channels less than the total number of physical resource channels supported by the wireless communication network.

21. The network node of claim 19, wherein the first set of physical resource channels are located at a specific frequency location within the bandwidth of the wireless communication system and the second set of physical resource channels are located at any frequency location within the bandwidth of the wireless communication system.

22. The network node of claim 21, wherein the first set of physical resource channels is located at the center of the bandwidth of the wireless communication system.

23. The network node of claim 19, wherein the first set of physical resource channels comprises six physical resource blocks.

24. The network node of claim 19, wherein the first time period overlaps with an ON duration of a discontinuous receive cycle of the wireless device.

* * * * *

UNITED STATES PATENT AND TRADEMARK OFFICE
CERTIFICATE OF CORRECTION

PATENT NO. : 10,321,345 B2
APPLICATION NO. : 15/915286
DATED : June 11, 2019
INVENTOR(S) : Kazmi et al.

It is certified that error appears in the above-identified patent and that said Letters Patent is hereby corrected as shown below:

In the Specification

In Column 1, Line 7, delete "2016," and insert -- 2016, now Pat. No. 9,918,243, --, therefor.

In Column 1, Line 52, delete "specifics" and insert -- specifies --, therefor.

In Column 2, Line 52, delete "hand." and insert -- band. --, therefor.

In Column 3, Lines 30-31, delete "symbol" and insert -- signal --, therefor.

In Column 3, Line 31, delete "symbol" and insert -- signal --, therefor.

In Column 3, Line 61, delete "ratio" and insert -- rate --, therefor.

In Column 9, Line 19, delete "narrow band" and insert -- narrowband --, therefor.

In Column 10, Line 63, delete "fill" and insert -- full --, therefor.

In Column 12, Line 11, delete "(SCells)." and insert -- (SCells)). --, therefor.

In Column 14, Line 23, delete "$\delta f|<|\Delta F.$" and insert -- $|\delta f|<|\Delta F|$. --, therefor.

In Column 16, Line 38, delete "13μs)." and insert -- $\pm 3\mu s$). --, therefor.

In Column 18, Line 2, delete "SFN 0." and insert -- SFN=0. --, therefor.

In Column 18, Lines 21-22, delete "measuremcnt" and insert -- measurement --, therefor.

In Column 20, Line 9, delete "(Cnarrow" and insert -- Cnarrow --, therefor.

Signed and Sealed this
Eighth Day of October, 2019

Andrei Iancu
*Director of the United States Patent and Trademark Office*

CERTIFICATE OF CORRECTION (continued)
U.S. Pat. No. 10,321,345 B2

In Column 21, Line 10, delete "RDM," and insert -- RLM, --, therefor.

In Column 23, Line 29, delete "type" and insert -- type communication --, therefor.

In Column 25, Line 18, delete "operation:" and insert -- operation; --, therefor.

In Column 27, Line 21, delete "Ratio" and insert -- Rate --, therefor.

In Column 27, Line 28, delete "Symbols" and insert -- Signals --, therefor.

In Column 27, Line 31, delete "Symbols" and insert -- Signals --, therefor.

In Column 27, Line 50, delete "Identifier" and insert -- Identity --, therefor.

In Column 27, Line 64, delete "Symbol" and insert -- Signal --, therefor.

In Column 28, Line 5, delete "Equipmen" and insert -- Equipment --, therefor.

In the Claims

In Column 28, Line 31, in Claim 1, delete "he" and insert -- be --, therefor.

In Column 28, Line 42, in Claim 2, delete "Claim" and insert -- claim --, therefor.